(12) United States Patent
Enjo et al.

(10) Patent No.: US 11,072,847 B2
(45) Date of Patent: Jul. 27, 2021

(54) CAST PRODUCT HAVING ALUMINA BARRIER LAYER

(71) Applicant: KUBOTA CORPORATION, Osaka (JP)

(72) Inventors: Youhei Enjo, Hirakata (JP); Makoto Hineno, Kobe (JP); Shinichi Uramaru, Hirakata (JP); Kunihide Hashimoto, Ikoma (JP)

(73) Assignee: KUBOTA CORPORATION, Osaka (JP)

( * ) Notice: Subject to any disclaimer, the term of this patent is extended or adjusted under 35 U.S.C. 154(b) by 91 days.

(21) Appl. No.: 16/227,970

(22) Filed: Dec. 20, 2018

(65) Prior Publication Data

US 2019/0136361 A1     May 9, 2019

Related U.S. Application Data

(60) Division of application No. 14/220,280, filed on Mar. 20, 2014, now abandoned, which is a continuation of
(Continued)

(30) Foreign Application Priority Data

Mar. 23, 2012 (JP) ................................. 2012-067827
Mar. 23, 2012 (JP) ................................. 2012-067828
(Continued)

(51) Int. Cl.
*C23C 8/10* (2006.01)
*C23C 8/02* (2006.01)
(Continued)

(52) U.S. Cl.
CPC ............... *C23C 8/02* (2013.01); *B22D 13/02* (2013.01); *B22D 21/00* (2013.01); *B22D 29/00* (2013.01);
(Continued)

(58) Field of Classification Search
CPC ..... C23C 8/01–18; C22C 37/06; C22C 37/08; C22C 37/10; B22D 13/02; B22D 21/00; B22D 29/00
See application file for complete search history.

(56) References Cited

U.S. PATENT DOCUMENTS

| 4,204,862 A | 5/1980 | Kado et al. |
| 2007/0034302 A1 | 2/2007 | Takahashi et al. |

(Continued)

FOREIGN PATENT DOCUMENTS

| CN | 1836061 A | 9/2006 |
| CN | 101370951 A | 2/2009 |

(Continued)

OTHER PUBLICATIONS

Zhang et al. "Metal Dusting of Alumina-Forming Creep-Resistance Austenitic Stainless Steels", Oxid Met (2012) 77:167-187 Published online on Dec. 23, 2011.*

(Continued)

*Primary Examiner* — Lois L Zheng
(74) *Attorney, Agent, or Firm* — Eckert Seamans Cherin & Mellott, LLC

(57) ABSTRACT

To provide a cast product having an alumina barrier layer and method for producing the same. A cast product having an alumina barrier layer of the present invention is a cast product in which an alumina barrier layer containing $Al_2O_3$ is formed on the surface of a cast body, and the cast body contains C: 0.3 mass % to 0.7 mass %, Si: 0.1 mass % to 1.5 mass %, Mn: 0.1 mass % to 3 mass %, Cr: 15 mass % to 40 mass %, Ni: 20 mass % to 55 mass %, Al: 2 mass % to 4 mass %, rare earth element: 0.005 mass % to 0.4 mass %, W: 0.5 mass % to 5 mass % and/or Mo: 0.1 mass % to 3 mass
(Continued)

%, and 25 mass % or more of Fe in the remainder and an inevitable impurity, and 80 mass % or more of the rare earth element is La.

11 Claims, 12 Drawing Sheets

Related U.S. Application Data application No. PCT/JP2013/056240, filed on Mar. 7, 2013.

(30) Foreign Application Priority Data

| Mar. 30, 2012 | (JP) | ................................ | 2012-078851 |
| Jan. 24, 2013 | (JP) | ................................ | 2013-010883 |

(51) Int. Cl.

| C21D 6/00 | (2006.01) |
| C21D 9/08 | (2006.01) |
| C23C 8/14 | (2006.01) |
| C22C 38/44 | (2006.01) |
| B22D 13/02 | (2006.01) |
| C22C 19/05 | (2006.01) |
| C22C 38/00 | (2006.01) |
| C22C 38/02 | (2006.01) |
| C22C 38/04 | (2006.01) |
| C22C 38/06 | (2006.01) |
| C22C 38/48 | (2006.01) |
| C22C 38/50 | (2006.01) |
| C22C 38/54 | (2006.01) |
| C22C 38/58 | (2006.01) |
| C22C 38/40 | (2006.01) |
| C23C 8/18 | (2006.01) |
| B23K 9/23 | (2006.01) |
| B22D 29/00 | (2006.01) |
| B23K 31/00 | (2006.01) |
| B22D 21/00 | (2006.01) |
| C22C 30/00 | (2006.01) |
| C22F 1/10 | (2006.01) |
| B23K 103/06 | (2006.01) |
| B23K 101/34 | (2006.01) |

(52) U.S. Cl.
CPC ................ *B23K 9/23* (2013.01); *B23K 31/00* (2013.01); *C21D 6/004* (2013.01); *C21D 9/08* (2013.01); *C22C 19/05* (2013.01); *C22C 19/052* (2013.01); *C22C 19/053* (2013.01); *C22C 19/055* (2013.01); *C22C 19/056* (2013.01); *C22C 30/00* (2013.01); *C22C 38/005* (2013.01); *C22C 38/02* (2013.01); *C22C 38/04* (2013.01); *C22C 38/06* (2013.01); *C22C 38/40* (2013.01); *C22C 38/44* (2013.01); *C22C 38/48* (2013.01); *C22C 38/50* (2013.01); *C22C 38/54* (2013.01); *C22C 38/58* (2013.01); *C22F 1/10* (2013.01); *C23C 8/14* (2013.01); *C23C 8/18* (2013.01); *B23K 2101/34* (2018.08); *B23K 2103/06* (2018.08); *C21D 6/005* (2013.01); *C21D 6/008* (2013.01); *Y10T 428/24355* (2015.01); *Y10T 428/265* (2015.01)

(56) References Cited

U.S. PATENT DOCUMENTS

| 2008/0279716 | A1 | 11/2008 | Nishiyama et al. |
| 2011/0318593 | A1 | 12/2011 | Takahashi et al. |
| 2012/0301347 | A1 | 11/2012 | Muralidharan et al. |

FOREIGN PATENT DOCUMENTS

| EP | 1 186 351 | A1 | 3/2002 |
| JP | 52-078612 | | 7/1977 |
| JP | 57-039159 | | 3/1982 |
| JP | 59-107040 | A | 6/1984 |
| JP | 61-210634 | A | 9/1986 |
| JP | 02-054751 | A | 2/1990 |
| JP | HEI 06-049602 | A | 2/1994 |
| JP | 06-306653 | A | 11/1994 |
| JP | 2000-008152 | A | 1/2000 |
| JP | 2009-233721 | A | 10/2009 |
| JP | 2011-190478 | A | 9/2011 |
| WO | 2010/113830 | A1 | 10/2010 |

OTHER PUBLICATIONS

Yoshida, T., "Al2O3 Passivation Welded Bellows", Valqua Technology News, No. 15, Jul. 10, 2008, pp. 2-6.
Japanese Patent Office, "International Search Report", dated May 28, 2013, 2012, 6 pp.
Japanese Patent Office, "Office Action", from counterpart Japanese Patent Application No. 2016-143108, dated May 30, 2017, 3 pp. (No English language translation available).
European Patent Office, "extended European Search Report", from counterpart EP Application No. 13 764 409.2, 8 pp., dated Feb. 22, 2016.
State Intellectual Property Office (CN), "Office Action", from counterpart CN Application No. 201380016092.6, 9 pp.
The International Bureau of WIPO, "English translation of International Preliminary Report on Patentability", dated Oct. 2, 2014, 12 pp.
Chinese Patent Office, "Office Action for Chinese patent application No. 201380016092.6", dated Sep. 1, 2015, 10 pp.
Japanese Patent Office, "Office Action", from counterpart Japanese Patent Application No. 2013-010883, dated Aug. 16, 2016, 3 pp. (No English language translation available).

* cited by examiner

INVENTIVE EXAMPLE: NO. 204
(AFTER ACID TREATMENT)

INVENTIVE EXAMPLE: NO. 205
(AFTER ACID TREATMENT)

INVENTIVE EXAMPLE: NO. 206
(AFTER ACID TREATMENT)

INVENTIVE EXAMPLE:NO.207
(AFTER ACID TREATMENT)

REFERENCE EXAMPLE:NO.311
(AFTER ACID TREATMENT)

AQUA REGIA 3 MINUTES

REFERENCE EXAMPLE:NO.312
(AFTER ACID TREATMENT)

AQUA REGIA 10 MINUTES

COMPARATIVE EXAMPLE: NO.421
(WITHOUT ACID TREATMENT)

WITHOUT ANY TREATMENT

INVENTIVE EXAMPLE: NO.201
(AFTER HEAT TREATMENT)

INVENTIVE EXAMPLE: NO.202
(AFTER HEAT TREATMENT)

INVENTIVE EXAMPLE:NO.203
(AFTER HEAT TREATMENT)

INVENTIVE EXAMPLE:NO.204
(AFTER HEAT TREATMENT)

INVENTIVE EXAMPLE:NO.205
(AFTER HEAT TREATMENT)

INVENTIVE EXAMPLE: NO. 206
(AFTER HEAT TREATMENT)

INVENTIVE EXAMPLE: NO. 207
(AFTER HEAT TREATMENT)

REFERENCE EXAMPLE: NO. 311
(AFTER HEAT TREATMENT)

AQUA REGIA 3 MINUTES

REFERENCE EXAMPLE:NO.312
(AFTER HEAT TREATMENT)

AQUA REGIA 10 MINUTES

COMPARATIVE EXAMPLE:NO.421
(AFTER HEAT TREATMENT)

WITHOUT ANY TREATMENT

INVENTIVE EXAMPLE:NO.201

INVENTIVE EXAMPLE:NO.202

INVENTIVE EXAMPLE:NO.203

INVENTIVE EXAMPLE:NO.204

INVENTIVE EXAMPLE:NO.205

INVENTIVE EXAMPLE:NO.206

INVENTIVE EXAMPLE:NO.207

REFERENCE EXAMPLE:NO.311

REFERENCE EXAMPLE:NO.312

COMPARATIVE EXAMPLE:NO.421

CAST PRODUCT HAVING ALUMINA BARRIER LAYER

CROSS-REFERENCE TO RELATED APPLICATIONS

This application is a divisional of U.S. patent application Ser. No. 14/220,280, filed Mar. 20, 2014, entitled "CAST PRODUCT HAVING ALUMINA BARRIER LAYER", the contents of which are incorporated in their entirety herein by reference.

BACKGROUND OF THE INVENTION

Field of the Invention

The present invention relates to a cast product having an alumina barrier layer, and a method for producing the same.

Description of Related Art

In heat resistant cast steel products such as reaction tubes and decomposition tubes for production of ethylene, hearth rolls, radiant tubes and metal resistant dusting members, austenite-based heat resistant alloys that are excellent in high temperature strength are used because they are exposed to a high temperature atmosphere.

In these austenite-based heat resistant alloys, a metal oxide layer is formed on the surface during use in a high temperature atmosphere, and this oxide layer serves as a barrier to protect the base material in the high temperature atmosphere.

On the other hand, when Cr oxides (mainly composed of $Cr_2O_3$) are formed as such metal oxides, the function of preventing entry of oxygen or carbon is insufficient because of their poor tightness, and internal oxidization occurs in a high temperature atmosphere, and thus the oxide film is bloated. Further, these Cr oxides are easy to peel off during repeated cycles of heating and cooling, and even when they do not eventually peel off, oxygen or carbon from the external atmosphere can pass through the film to disadvantageously lead internal oxidization or cementation in the base material because the function of preventing entry of oxygen or carbon is insufficient.

For addressing to this problem, it is proposed to form, on the surface of a base material, an oxide layer mainly composed of alumina ($Al_2O_3$) that is tight and less permeable to oxygen and carbon, by containing larger quantity of Al compared with that of general austenite-based heat resistant alloys (see, for example, Japanese Patent Laid-open Publication No. 52-78612, and Japanese Patent Laid-open Publication No. 57-39159).

However, since Al is a ferrite generating element, it will deteriorate the ductility of the material, and decrease high temperature strength when the content is too large. This ductility decreasing tendency is observed, in particular, when the content of Al exceeds 4%.

Therefore, the austenite-based heat resistant alloys in the above patent documents have a disadvantage of causing deterioration in ductility of a base material although they are expected to improve the barrier function by $Al_2O_3$.

For addressing to this problem, WO 2010/113830 proposes a cast product in which an alumina barrier layer containing $Al_2O_3$ is formed on the inner surface of the cast body, and Cr base particles having higher Cr concentration than the base material matrix are dispersed at the boundary between the alumina barrier layer and the cast body, by conducting an inner surface process so that the surface roughness (Ra) of the cast body is 0.05 μm to 2.5 μm followed by a heat treatment in an oxidizing atmosphere, for providing a cast product capable of ensuring high temperature stability of an alumina barrier layer without making the Al content exceeding 4%, and capable of exerting excellent barrier function in a high temperature atmosphere without deteriorating the ductility of the material.

The cast product in WO 2010/113830 is able to keep the excellent oxidation resistance, cementation resistance, nitriding resistance, corrosion resistance and so on for a long term in use in a high temperature atmosphere owing to the presence of the stable alumina barrier layer.

As a result of the study by the present inventors, it was demonstrated that when the cast products having excellent oxidation resistance, cementation resistance, nitriding resistance, corrosion resistance and so on disclosed in WO 2010/113830 are exposed to higher temperature, tensile ductility was deteriorated in some of the cast products.

Accordingly, it is a first object of the present invention to find the factor of deteriorating the high temperature tensile ductility and to provide an austenite-based cast product having an alumina barrier layer that is excellent in high temperature tensile ductility.

Further, when the inner surface process to a cast body is conducted by a skiving process which is a general finishing process, scratches can arise on the surface of the cast body. Such a scratch part has a surface property different from that of the remaining part of the base material because a processing strain is excessively added, and the surface roughness is roughened. As a result, in the subsequent heat treatment step, Cr oxide is formed on the superficial surface of the scratch part, and a mass of Al oxide will be formed directly beneath the same.

As described above, since uniform film of $Al_2O_3$ is not formed and $Cr_2O_3$ film is mainly formed in the scratch part, high temperature corrosion is more likely to occur in the scratch part when it is exposed to high temperature of about 1080° C. or higher for a long time, because the base material cannot be protected by oxidation film in the scratch part in comparison with the base material part where $Al_2O_3$ film is uniformly formed.

For addressing to this problem, it is conceivable to conduct polishing such as honing process for removing these scratches, however, increase in process costs, and extension of production period will be caused.

Further, when the cast product is a straight tube, and thus has a small diameter or a large length, the polishing such as the honing process cannot be effected over the entire length as described above, and a part having large surface roughness can be left. As a result, in these parts, desired $Al_2O_3$ film cannot be formed in some cases.

A so-called U-shaped tube having a bent portion is produced by bending a straight tube having previously subjected to a surface treatment and a heat treatment by processing. However, the alumina barrier layer formed on the surface of the straight tube can peel off due to strain or the like occurring in the bent portion at the time of bending the straight tube. This phenomenon is significantly observed, in particular, on the ventral side, or the inner side of the bent portion.

Accordingly, it is a second object of the present invention to provide a cast product capable of forming a uniform alumina barrier layer on the entire surface, and a method for producing the same.

When a cast product formed with an alumina barrier layer is prepared, and the obtained cast product is joined by welding, residual stress and strain occur in a so-called heat influenced part that is susceptible to the heat at the time of welding. As a result, the preliminarily formed alumina barrier layer can partly peel off.

For addressing to this problem, it is conceivable to form an alumina barrier layer by conducting a heat treatment after joining the cast products having subjected to a surface treatment by welding, however, in this case, metal oxides mainly composed of Cr oxides are formed, in particular, in the welded part, and an alumina barrier layer having sufficient cementation resistance cannot be formed.

In conventional arts, in contrast to the cast body formed with an alumina barrier layer, a welded part not formed with an alumina barrier layer allows entry of oxygen, carbon, nitrogen and the like from the external atmosphere and cannot prevent oxidation, carbonization and nitriding for a long term.

Accordingly, it is a third object of the present invention to provide a cast product in which metal oxides mainly composed of Cr oxides are not formed in a welded part, and an alumina barrier layer is formed on the entire surface, and a method for producing the same.

SUMMARY OF THE INVENTION

For solving the aforementioned first object, a cast product having an alumina barrier layer according to the present invention is a cast product including an alumina barrier layer containing $Al_2O_3$ formed on the surface of a cast body, and the cast body contains C: 0.3 mass % to 0.7 mass %, Si: 0.1 mass % to 1.5 mass %, Mn: 0.1 mass % to 3 mass %, Cr: 15 mass % to 40 mass %, Ni: 20 mass % to 55 mass %, Al: 2 mass % to 4 mass %, rare earth element: 0.005 mass % to 0.4 mass %, W: 0.5 mass % to 5 mass % and/or Mo: 0.1 mass % to 3 mass %, and 25 mass % or more of Fe, and an inevitable impurity, and 80 mass % or more of the rare earth element is La.

Further, for solving the aforementioned second object, a method for producing a cast product having an alumina barrier layer on the surface according to the present invention is a method for producing a cast product for use in a high temperature atmosphere, and the method including:

a step of conducting an acid treatment by an acid solution containing a polyhydric alcohol liquid on the surface of a cast body made of a heat resistant alloy containing 15 mass % or more of Cr, 20 mass % or more of Ni, and 2 mass % to 4 mass % of Al, and a heat treatment step of conducting a heat treatment on the cast body on which the acid treatment is conducted, to form an alumina barrier layer containing $Al_2O_3$ on the surface.

Further, for solving the aforementioned third object, a method for producing a cast product according to the present invention is a method for producing a cast product for use in a high temperature atmosphere, obtainable by joining a first cast body and a second cast body made of a heat resistant alloy containing 15 mass % or more of Cr, 20 mass % or more of Ni, and 2 mass % to 4 mass % of Al by welding, and the method includes: the step of joining the first cast body and the second cast body by welding;

the step of conducting a surface treatment on the joined welded part; and the step of conducting a heat treatment on the welded part having subjected to the surface treatment.

Further, for solving the aforementioned third object, the cast product having an alumina barrier layer of the present invention is a cast product for use in a high temperature atmosphere, formed by joining a first cast body and a second cast body made of a heat resistant alloy containing 15 mass % or more of Cr, 20 mass % or more of Ni, and 2 mass % to 4 mass % of Al by welding, and the welded part between the first cast body and the second cast body is covered with an alumina barrier layer containing $Al_2O_3$.

DETAILED DESCRIPTION OF THE PREFERRED EMBODIMENT

Figure 1:
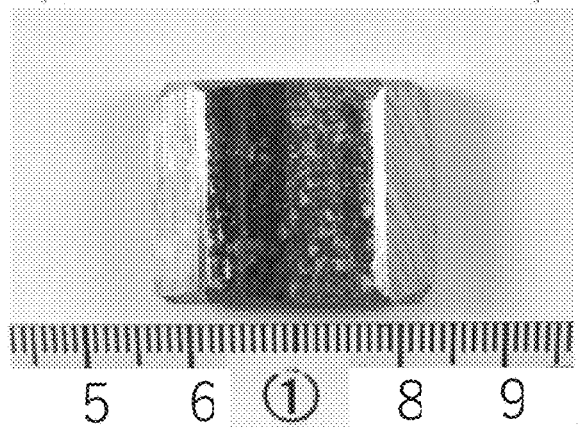
FIG. 1 is a surface photograph of specimen No. 201 which is an inventive example in Example 2 after acid treatment and before heat treatment.
Figure 2:
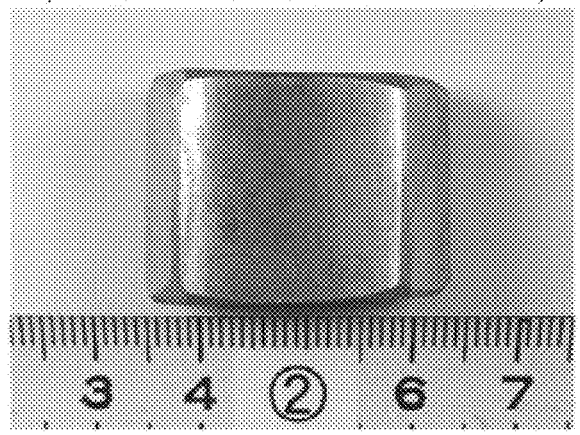
FIG. 2 is a surface photograph of specimen No. 202 which is an inventive example in Example 2 after acid treatment and before heat treatment.
Figure 3:
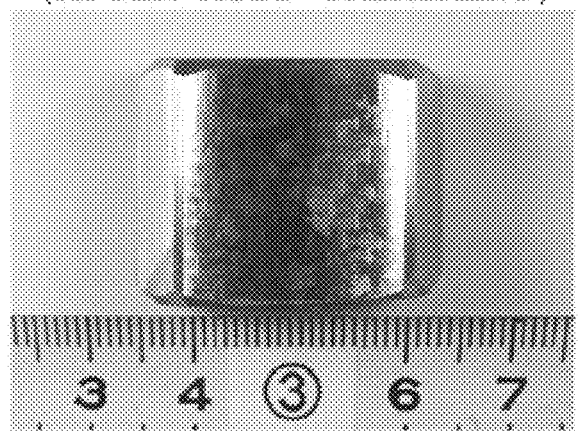
FIG. 3 is a surface photograph of specimen No. 203 which is an inventive example in Example 2 after acid treatment and before heat treatment.
Figure 4:
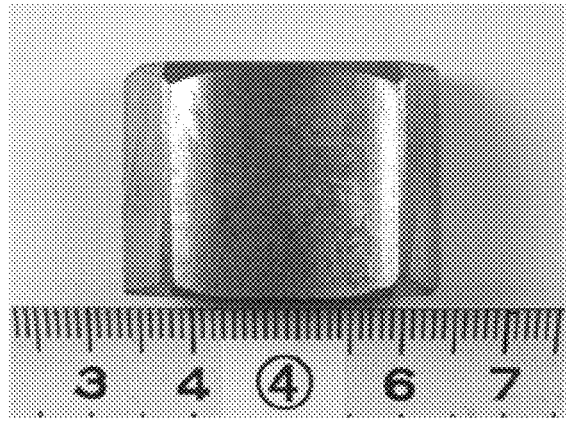
FIG. 4 is a surface photograph of specimen No. 204 which is an inventive example in Example 2 after acid treatment and before heat treatment.
Figure 5:
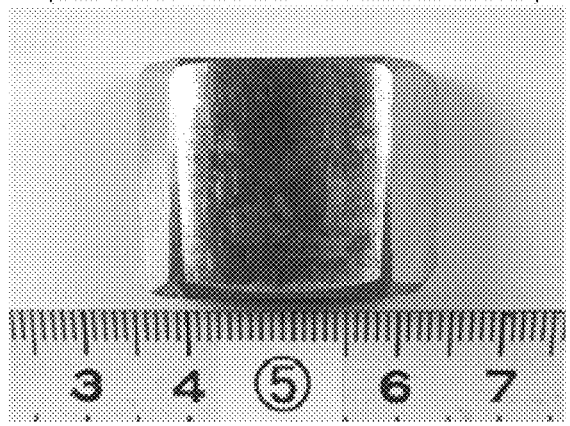
FIG. 5 is a surface photograph of specimen No. 205 which is an inventive example in Example 2 after acid treatment and before heat treatment.
Figure 6:
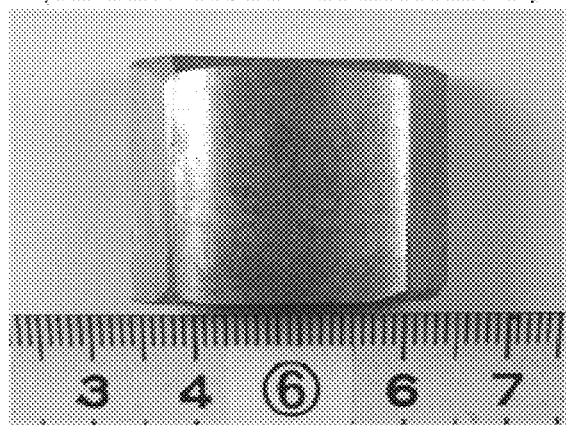
FIG. 6 is a surface photograph of specimen No. 206 which is an inventive example in Example 2 after acid treatment and before heat treatment.
Figure 7:
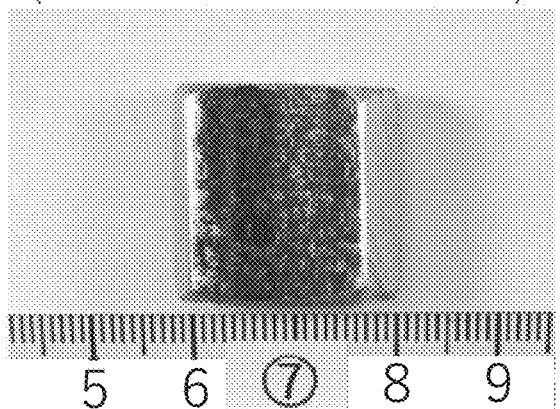
FIG. 7 is a surface photograph of specimen No. 207 which is an inventive example in Example 2 after acid treatment and before heat treatment.
Figure 8:
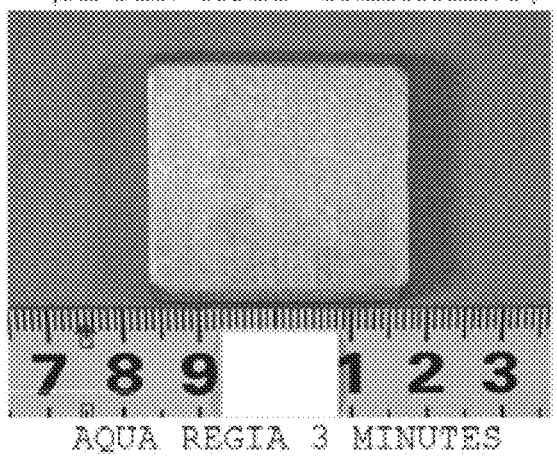
FIG. 8 is a surface photograph of specimen No. 311 which is a reference example in Example 2 after acid treatment and before heat treatment.
Figure 9:
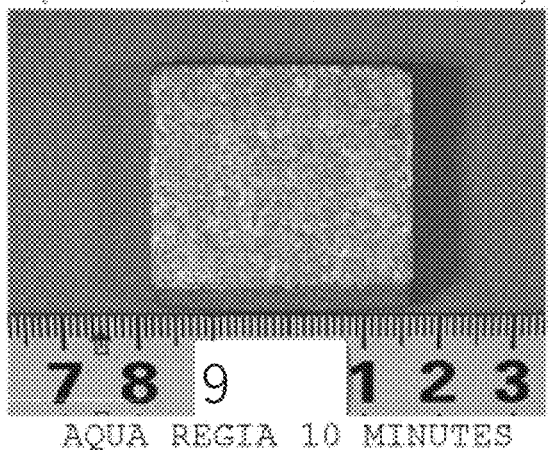
FIG. 9 is a surface photograph of specimen No. 312 which is a reference example in Example 2 after acid treatment and before heat treatment.
Figure 10:
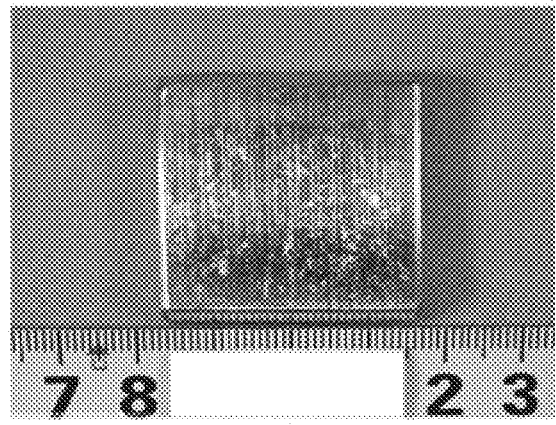
FIG. 10 is a surface photograph of specimen No. 421 which is a comparative example in Example 2 before heat treatment (without acid treatment)
Figure 11:
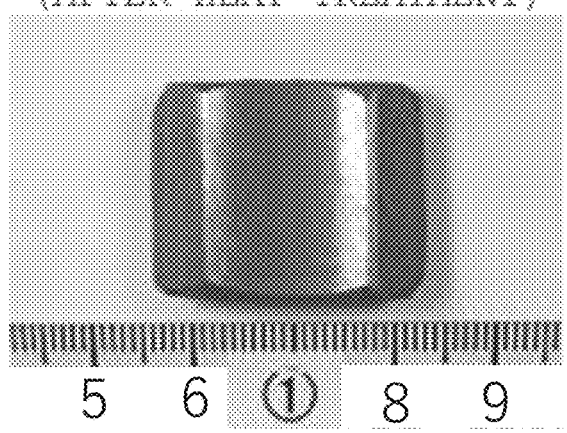
FIG. 11 is a surface photograph of specimen No. 201 which is an inventive example in Example 2 after heat treatment.
Figure 12:
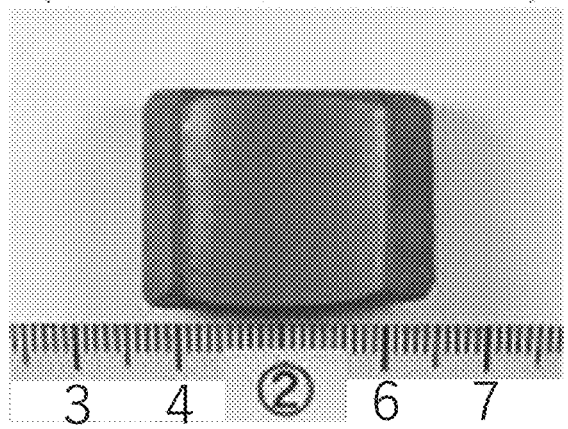
FIG. 12 is a surface photograph of specimen No. 202 which is an inventive example in Example 2 after heat treatment.
Figure 13:
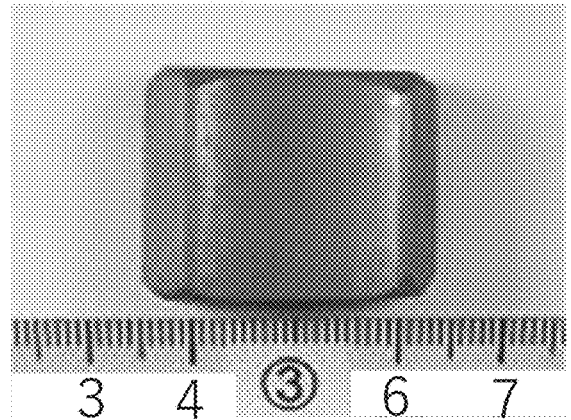
FIG. 13 is a surface photograph of specimen No. 203 which is an inventive example in Example 2 after heat treatment.
Figure 14:
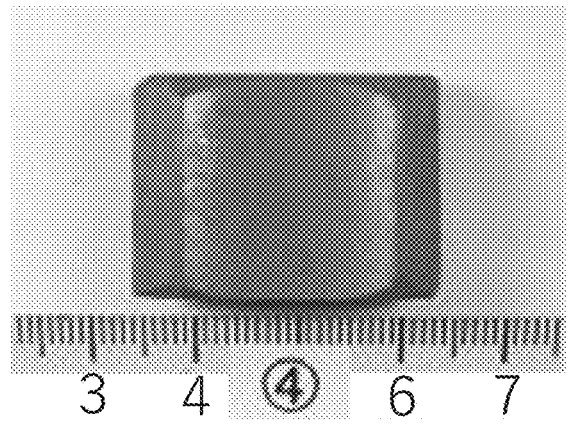
FIG. 14 is a surface photograph of specimen No. 204 which is an inventive example in Example 2 after heat treatment.
Figure 15:
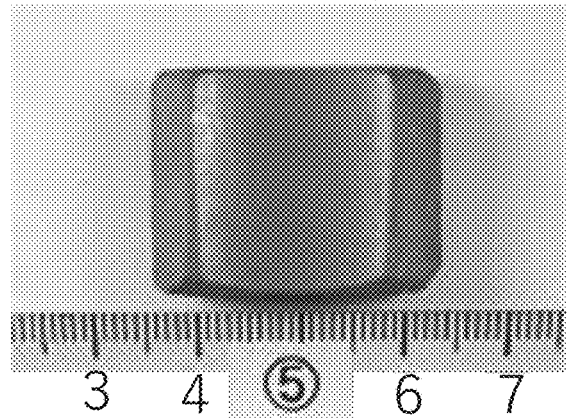
FIG. 15 is a surface photograph of specimen No. 205 which is an inventive example in Example 2 after heat treatment.
Figure 16:
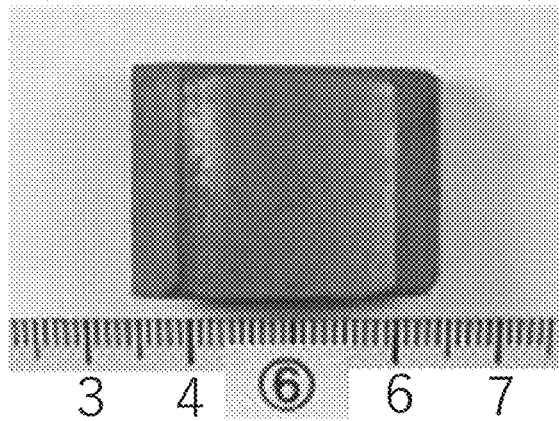
FIG. 16 is a surface photograph of specimen No. 206 which is an inventive example in Example 2 after heat treatment.
Figure 17:
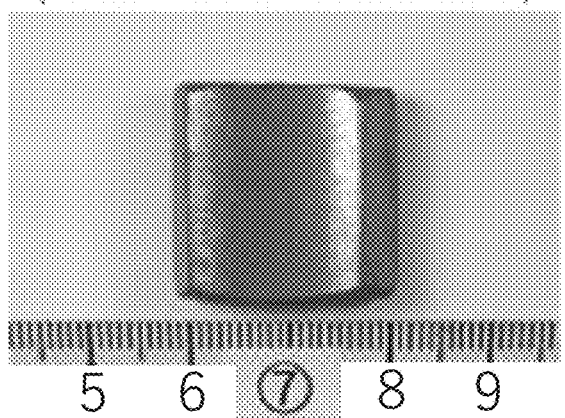
FIG. 17 is a surface photograph of specimen No. 207 which is an inventive example in Example 2 after heat treatment.

In the following, three embodiments of the present invention will be specifically described.

First Embodiment

The first embodiment according to the present invention provides a cast product in which an alumina barrier layer containing $Al_2O_3$ is formed on a surface of a cast body, and the cast body contains C: 0.3 mass % to 0.7 mass %, Si: 0.1 mass % to 1.5 mass %, Mn: 0.1 mass % to 3 mass %, Cr: 15 mass % to 40 mass %, Ni: 20 mass % to 55 mass %, Al: 2 mass % to 4 mass %, rare earth element: 0.005 mass % to 0.4 mass %, W: 0.5 mass % to 5 mass % and/or Mo: 0.1 mass % to 3 mass %, and 25 mass % or more of Fe in the remainder and an inevitable impurity, and 80 mass % or more of the rare earth element is occupied by La. In this description, "%" is "mass %" unless otherwise specified.

<Description of Reason for Component Limitation>

C: 0.3% to 0.7%

C has a function of improving the castability and increasing the high temperature creep rupture strength. Therefore, C is contained in at least 0.3%. However, when the content is too large, primary carbide of $Cr_7C_3$ tends to be widely formed, and migration of Al that forms the alumina barrier layer is suppressed, so that the supply of Al to the surface part of the cast body is insufficient, and the alumina barrier layer is locally fragmented and the continuity of the alumina barrier layer is impaired. Further, since secondary carbide excessively precipitates, ductility and toughness are deteriorated. For this reason, the upper limit is set at 0.7%. The content of C is more preferably 0.4% to 0.5%.

Si: 0.1% to 1.5%

Si is contained in at least 0.1% as a deoxidant for molten alloy, for increasing the fluidity of molten alloy, and the upper limit is 1.5% because too large content will lead deterioration in high temperature creep rupture strength. The upper limit of Si is more preferably 1.0%.

Mn: 0.1% to 3%

Mn is contained in at least 0.1% as a deoxidant for molten alloy, for immobilizing S in molten metal, and the upper limit is 3% because too large content will lead deterioration in high temperature creep rupture strength. The upper limit of Mn is preferably 1.6%.

Cr: 15% to 40%

Cr is contained in 15% or more for the purpose of contribution to improvement in high temperature strength and repeated oxidation resistance. However, the upper limit is 40% because too large content will lead deterioration in high temperature creep rupture strength. Cr occupies more preferably 20% to 30%.

Ni: 20% to 55%

Ni is an element required for ensuring repeated oxidation resistance and stability of metal tissue. When the content of Ni is small, the content of Fe is relatively large, so that Cr—Fe—Mn oxide is more likely to be generated on the surface of the cast body, and hence generation of an alumina barrier layer is inhibited. For this reason, Ni is contained in 20% or more. However, since the effect of increasing the amount is no longer obtained with the content of Ni exceeding 55%, the upper limit is 55%. Ni is contained more preferably in 28% to 45%.

Al: 2% to 4%

Al is an element that is effective for improving the cementation resistance and the caulking resistance. In the present invention, it is an essential element for generating an alumina barrier layer on the surface of a cast body. Therefore, Al is contained in at least 2% or more. However, when the content exceeds 4%, the ductility will be deteriorated as described above, and hence the upper limit is specified at 4% in the first embodiment of the present invention. The content of Al is more preferably 2.5% to 3.8%.

Rare earth element: 0.005% to 0.4%, wherein 80% or more of the same is La.

Rare earth elements mean seventeen elements including fifteen elements in the lanthanum series from La to Lu in the periodic table, as well as Y and Sc, and 80% or more of the rare earth element contained in the heat resistant alloy in the first embodiment of the present invention is La. By containing La in 80% or more, it is possible to increase the generation amount of Ni—La compounds such as $Ni_2La$ and $Ni_3La$ having excellent high temperature tensile ductility, and in particular, high temperature tensile ductility at 1100° C. or higher.

Rare earth elements have the ability of immobilizing S and the ability of immobilizing oxide film by rare earth oxide, and are contained in 0.005% or more for contributing to facilitation for generation and stabilization of an alumina barrier layer. The upper limit is 0.4% because too large amount will deteriorate the ductility and toughness.

Further, the content of Ce in the rare earth element is desirably 0.1% or less. By controlling the Ce content, it is possible to reduce the generation amount of Ce compounds such as $Ni_2Ce$ and $Ni_3Ce$ that cause high temperature brittleness, and to increase the high temperature tensile ductility. More preferably, the rare earth element does not contain Ce and is composed of only La.

W: 0.5% to 5% and/or Mo: 0.1% to 3%

W and Mo solid-solved in the matrix and reinforce the austenite phase of the matrix, thereby improving the creep rupture strength. For exertion of this effect, at least either of W and Mo is contained, and in the case of W, 0.5% or more is contained, and in the case of Mo, 0.1% or more is contained.

However, too large W and Mo contents will lead decrease in ductility and deterioration in cementation resistance, and W and Mo have a function of inhibiting generation of an alumina barrier layer by suppressing migration of Al by being solid-solved in the matrix because they have large atomic radii. Further, likewise the case where the content of C is large, primary carbides of $(Cr, W, Mo)_7C_3$ are likely to be formed widely, and migration of Al that forms an alumina barrier layer is suppressed, so that the supply of Al to the surface part of the cast body is insufficient, and the alumina barrier layer is locally fragmented and the continuity of the alumina barrier layer is more likely to be impaired. Since W and Mo have large atomic radii, they are solid-solved in the matrix and have the effect of preventing generation of an alumina barrier layer by suppressing migration of Al or Cr.

Therefore, W is 5% or less, and Mo is 3% or less. More preferably, W is 0.5% to 3%, and Mo is 2% or less.

At least one of Ti: 0.01% to 0.6%, Zr: 0.01% to 0.6% and Nb: 0.1% to 3.0%

Since Ti, Zr and Nb are elements that are easy to form carbide, and are less likely to be solid-solved in the matrix compared with W and Mo, something special function on formation of an alumina barrier layer is not recognized, however, it has a function of improving the creep rupture strength. At least one of Ti, Zr and Nb may be contained as is necessary. The content is 0.01% or more for Ti and Zr, and 0.1% or more for Nb.

However, excess addition will cause deterioration in the ductility. Nb also deteriorates the peeling resistance of the alumina barrier layer. Therefore, the upper limit is 0.6% for Ti and Zr, and 3.0% for Nb. Preferably, the upper limit is 0.3% for Ti and Zr, and 1.5% for Nb.

B: 0.1% or less

B may be contained as is necessary because it has a function of reinforcing grain boundaries of a cast body. The amount of B, if added, should be more than 0 to 0.1% or less because too large content will deteriorate the creep rupture strength. The content of B is more preferably more than 0.01% and 0.1% or less.

Fe: 25% or more

Diffusing speeds of Al in Fe, Ni and Cr are expected to increase as the sizes of the atoms decrease. Therefore, by increasing Fe which is a smaller atom, and reducing the amount of Cr, it is possible to increase diffusion of Al in the alloy, to facilitate migration of Al, and to promote generation of film of $Al_2O_3$. Further, by reducing Cr, it is possible to inhibit generation of Cr oxide.

For this reason, Fe is contained in 25% or more. More preferably, Fe is contained in 30% or more.

Inevitable Impurity

P, S and other impurities that are inevitably contained during melt production of alloy may exist within the range normally allowed for this type of alloy material.

<Cast Body>

The cast body forming the cast product of the first embodiment of the present invention is casted to have the aforementioned composition by producing molten metal of the aforementioned element composition, followed by centrifugal casting, stationary casting and so on.

The obtainable cast body may have a shape suited for the intended use.

The first embodiment of the present invention is particularly suited for a cast body produced by centrifugal casting. By applying the centrifugal casting, fine metal tissues grow radially with an orientation as the cooling by a mold progresses, and alloy tissues where Al is easy to migrate can be obtained. As a result, in the heat treatment as will be described later, it is possible to obtain a cast product formed with film which is an alumina barrier layer having a smaller thickness than a conventional one, but having excellent strength even under a repetitively-heated environment in the later-described heat treatment.

As the cast product produced by centrifugal casting, a tube, in particular, a reaction tube used under a high temperature environment can be exemplified.

The cast body is subjected to a heating treatment in an oxidizing atmosphere after it is surface-treated in an objective site that is to be in contact with the high temperature atmosphere during use of the product, and the surface roughness of the site is adjusted.

<Surface Treatment>

As a surface treatment, a polishing treatment can be exemplified. The surface treatment is preferably conducted on the entire objective site that is to be in contact with a high temperature atmosphere during use of the product.

The surface treatment may be conducted so that the surface roughness (Ra) of the objective site is 0.05 µm to 2.5 µm. More desirably, the surface roughness (Ra) is 0.5 µm to 2.0 µm. When the surface roughness (Ra) is less than 0.05 µm, Cr is oxidized dominantly to Al, whereas when it is 0.05 µm or more, generation of Cr oxide scale can be suppressed, and an alumina barrier layer can be formed more preferably by the subsequent heat treatment. It is expected that Cr oxide scale is more likely to be generated due to the residual processing strain when it is 2.5 µm or more. At this time, by adjusting the surface roughness by the surface treatment, it is possible to remove the residual stress and strain in the heat-influenced part concurrently.

When the surface treatment is conducted by a polishing treatment, it is desired to conduct finish polishing with the use of #240 to #1200 after conducting paper polishing with the use of #12 to #220.

<Heat Treatment>

After conducting the surface treatment, a heat treatment is conducted in the following conditions.

The heat treatment is carried out by conducting a heating treatment in an oxidizing atmosphere.

The oxidizing atmosphere means an oxidizing environment in which oxidizing gas containing 20% by volume or more of oxygen or steam or $CO_2$ is mixed. The heating treatment is conducted at a temperature of 900° C. or higher, preferably 1000° C. or higher, and more preferably 1050° C. or higher, and the heating time is 1 hour or more.

<Cast Product>

As described above, by sequentially conducting the surface treatment and the heat treatment on the cast body, it is possible to obtain a cast product in which an alumina barrier layer containing $Al_2O_3$ is stably formed on the surface of the cast body.

<Alumina Barrier Layer>

The alumina barrier layer containing $Al_2O_3$ formed in the cast product of the present invention is highly tight and functions as a barrier for preventing external oxygen, carbon and nitrogen from entering the base material. In the first embodiment according to the present invention, the surface treatment is conducted in the site that is to be in contact with a high temperature atmosphere during use of the product to adjust the surface roughness of the site, and then the site is subjected to the heating treatment in an oxidizing atmosphere, and thus $Al_2O_3$ can be continuously formed as an alumina barrier layer on the surface of the cast product.

The thickness of the alumina barrier layer formed on the cast body is preferably 0.05 μm or more and 3 μm or less for effectively exerting the barrier function. When the thickness of the alumina barrier layer is less than 0.05 μm, the cementation resistance may be deteriorated, whereas when it exceeds 3 μm, peeling of the alumina barrier layer may be likely to advance due to the influence of difference in heat expansion coefficient between the base material and the film.

For avoiding the influence, the thickness of the alumina barrier layer is more preferably 0.1 μm or more and 2.5 μm or less. On the other hand, when the film thickness has variation, peeling of the film can advance as the temperature widely changes. Therefore, the thickness of the alumina barrier layer is desirably 0.5 μm or more and 1.5 μm or less, and most desirably about 1 μm on average.

When the surface of the cast product of the first embodiment of the present invention is observed by SEM/EDX, Cr oxide scale formed on a part of the alumina barrier layer is sometimes observed. This is attributed to that Cr oxide scale formed inside the alumina barrier layer is pushed up to the surface of the product by $Al_2O_3$. However, it is preferred that the oxide scale is as little as possible, and it is preferred that the oxide scale occupies less than 20 area % of the product surface, so that $Al_2O_3$ occupies 80 area % or more.

<Regarding La>

The cast product of the first embodiment according to the present invention is able to increase the tensile ductility at high temperature (concretely 1100° C. or higher) as much as possible as will be described later in Example 1 by making the content of La in the rare earth element 80%.

This is because the melting temperatures of Ni—La compounds are higher than the melting temperatures of Ni—Ce compounds, and high temperature embrittlement of a La-added material occurs in a temperature zone higher than 1200° C. More concretely, while melting points of $Ni_2Ce$ and $Ni_3Ce$ are respectively 1000° C. and 1180° C., the melting points of $Ni_2La$ and $Ni_3La$ are respectively 1100° C. and 1240° C.

Therefore, for use as a reaction tube, in particular, it is effective to contain La in 80% or more as the rare earth element that will not be embrittled in the use temperature region of Ce (about 1100° C.)

In the first embodiment according to the present invention, 80% or more of La is contained in the rare earth element by controlling the content of Ce, and for the Ce added material and the La added material, a repetitive oxidation test in an atmospheric air under furnace cooling at 1050° C. for a retention time of 10 hours was conducted, and difference in peeling resistance of $Al_2O_3$ was little observed.

Further, sensitivity to cracking (susceptibility to cracking) was evaluated for the case containing La in 80% or more by controlling the content of Ce in the rare earth element by a bead placement test (crack sensitivity test: see The Japan Welding Engineering Society web site http://www-it.jwe-s.or.jp/qa/details.jsp?pg_no=0100080100 for reference), to reveal that there is little influence.

The first embodiment according to the present invention is suitable as a cast product that is excellent in high temperature tensile ductility and is capable of effectively preventing oxygen, carbon, nitrogen and the like from entering from the external atmosphere by the alumina barrier layer.

Second Embodiment

In the second embodiment according to the present invention, a cast product formed with a so-called "alumina barrier layer" containing $Al_2O_3$ on the surface is obtained by conducting a surface treatment by an acid treatment on a heat resistant alloy containing 15% or more of Cr and 20% or more of Ni, and 2% to 4% of Al, and then conducting a heat treatment.

Influences of the components contained in the cast product are described in the part of <Description of reason for component limitation> in the first embodiment.

The contents of the components contained in the cast product of the second embodiment are as follows.

Cr: 15% or more

Cr is contained in 15% or more, and the upper limit is 40%. The content of Cr is more desirably 20% to 30%.

Ni: 20% or more

Ni is contained in at least 20% or more. Since the effect of increasing the amount is not obtained when Ni is contained in more than 55%, the upper limit is 55%. The content of Ni is more preferably 28% to 45%.

Al: 2% to 4%

Al is contained in at least 2% or more, and the upper limit is defined as 4%. The content of Al is more desirably 2.5% to 3.8%.

Besides these, the following components are preferably contained.

C: 0.3% to 0.7%

C is contained in at least 0.3%, and the upper limit is 0.7%. The content of C is more desirably 0.4% to 0.5%.

Si: exceeding 0.1% and 1.5% or less

Si is contained in at least 0.1%, and is contained in the upper limit of 1.5%. The content of Si is desirably 1.0% or less.

Mn: 0.1% to 3.0% or less

Mn is contained in the upper limit of 3.0%. The content of Mn is more desirably 1.6% or less.

Rare earth element: 0.005% to 0.4%

The rare earth element contained in the heat resistant alloy of the second embodiment according to the present invention is preferably at least one kind selected from the group consisting of Ce, La and Nd.

When generation of the alumina barrier layer is conducted by a heating treatment in an oxidizing atmosphere at high temperature, the rare earth element is contained in 0.005% or more, and the upper limit of 0.4%.

W: 0.5% to 5% and/or Mo: 0.1% to 3%

As to W and Mo, at least one of W and Mo is contained, and when W is contained, the content is 0.5% or more, whereas when Mo is contained, the content is 0.1% or more.

W is 3% or less, and Mo is 2% or less. Even when both elements are contained, the total content is preferably 3% or less.

At least one of Ti: 0.01% to 0.6%, Zr: 0.01% to 0.6% and Nb: 0.1% to 3.0%

As to Ti, Zr and Nb, Ti and Zr are contained in 0.01% or more, and Nb is contained in 0.1% or more.

However, the upper limit is 0.6% for Ti and Zr, and 3.0% for Nb.

B: 0.1% or less

B may be contained as is necessary. Even when it added, the amount is more than 0% and 0.1% or less. The content of B is more preferably more than 0.01% and 0.1% or less.

The heat resistant alloy forming the cast body of the second embodiment according to the present invention contains the above components, and the remainder of Fe, and for increasing diffusion of Al and promoting generation of film of $Al_2O_3$, it preferably contains 25% or more of Fe. Further, the remainder of Fe may contain P, S and other impurities that are inevitably contained at the time of casting into an alloy, within the ranges that are generally allowable for this kind of alloy material.

<Cast Body>

The cast body forming the cast product of the second embodiment according to the present invention is casted to have the aforementioned composition by producing molten metal, and followed by mold centrifugal casting, stationary casting or the like.

As a shape of the cast body, a straight tube, and a U-shaped tube with a bent portion formed by bending a straight tube, etc. are exemplified. As to a straight tube, the one having such inner diameter or length for which surface treatment by a polishing process or the like is difficult to be effected, is particularly suited, and as such a cast body, for example, a straight tube having an inner diameter of 40 mm or less and/or a length of 3000 mm or more can be exemplified. Further, so-called finishing processes such as an inner surface process and an inner surface honing may also be conducted as is necessary.

The aforementioned cast body is subjected to a surface treatment by an acid treatment for the objective site where it is to be in contact with a high temperature atmosphere during use of the product, and thus the surface roughness in the site is adjusted, and then subjected to a heating treatment in an oxidizing atmosphere.

<Surface Treatment (Acid Treatment)>

The surface treatment is an acid treatment by an acid solution containing a polyhydric alcohol liquid. The surface treatment by an acid treatment is preferably conducted for the entire objective site where it is to be in contact with a high temperature atmosphere during use of the product. As for the part finished by a polishing process or the like in a straight tube or a U-shaped tube, the acid treatment may be conducted only in the part out of reach of the polishing process, or in and around the bent portion of the U-shaped tube.

The acid treatment may be conducted so that the surface roughness (Ra) of the objective site is 0.05 µm to 2.5 µm. More desirably, the surface roughness (Ra) is 0.5 µm to 1.0 µm. As a result, it is possible to suppress generation of Cr oxide scale, and to form the alumina barrier layer containing $Al_2O_3$ by the subsequent heat treatment more preferably.

The acid treatment can be achieved by dipping the objective site in an acid solution containing a polyhydric alcohol liquid for a predetermined time, or by applying an acid solution containing a polyhydric alcohol liquid to the objective site. The corrosive liquid adhered to the objective site after the acid treatment is desirably washed out by water washing or the like.

As the acid solution, glyceregia liquid (nitric acid:hydrochloric acid:glycerol=1:3:1) and glycol liquid (nitric acid:hydrochloric acid:ethyleneglycol=1:3:1) are exemplified. As shown in the examples as will be described later, by the acid treatment only by strong acid such as aqua regia (nitric acid:hydrochloric acid=1:3), the surface layer is rough and $Al_2O_3$ is difficult to be formed.

As the polyhydric alcohol liquid, polyhydric alcohols such as glycerol and glycol are exemplified. In conducting the acid treatment, the oxidizing power is too strong only by strong acid, and the surface of the objective site will be corroded too much to reversely make the surface rough. For this reason, a polyhydric alcohol liquid is added to the acid solution. By adding the polyhydric alcohol liquid, it is possible to control or suppress the degree of oxidation or corrosion in the objective site by the acid solution, and to adjust the surface roughness. By using the polyhydric alcohol liquid, it is possible to suppress the oxidizing force and to facilitate adjustment of the surface roughness in comparison with the case of using monohydric alcohol.

<Heat Treatment>

On the cast body having subjected to the acid treatment, a heat treatment is conducted in the same condition as described in the part <Heat treatment> in the first embodiment.

<Cast Product>

As described above, by sequentially conducting the heat treatment after the acid treatment, it is possible to obtain a cast product in which the alumina barrier layer is stably formed over the entire objective site.

<Alumina Barrier Layer>

In the second embodiment according to the present invention, as described above, by subjecting the cast body to a surface treatment by an acid treatment in a site that is to be in contact with a high temperature atmosphere during use of the product, to adjust the surface roughness of the site, and then subjecting the site to a heating treatment in an oxidizing atmosphere, $Al_2O_3$ is formed continuously as an alumina barrier layer on the surface of the cast product. As a result, it is possible to form an alumina barrier layer over the entire surface of the objective site of the cast body.

The thickness of the alumina barrier layer formed on the cast body is formed into 0.05 µm or more and 3 µm or less for effectively exerting a barrier function, and is preferably about 1 µm on average. More desirably, the thickness of the alumina barrier layer is 0.5 µm or more and 1.5 µm or less.

Regarding a cast body having the aforementioned composition of Cr—Ni—Al heat resistant alloy, when a straight tube having small diameter and/or large length, and thus having a site for which a surface treatment by a polishing process of the like cannot be effected, is heated in an oxidizing atmosphere, the surface roughness is large and an alumina barrier layer is not formed in the site for which the surface treatment cannot be effected. Therefore, it is influenced by oxidization, cementation and so on from such a site.

Regarding a U-shaped tube formed by bending a straight tube, when a bending process is effected after forming an alumina barrier layer by subjecting a straight tube to a surface treatment and a heat treatment, the barrier layer formed on the surface of the straight tube, particularly on the ventral side of the bent portion can peel off due to strain or the like arising in the bent portion.

Further, Cr oxide scale based on $Cr_2O_3$ is dispersedly formed on the surface of the cast body, and is easy to peel off as described above, and at the time of peeling off, the alumina barrier layer beneath the same can peel off together.

In light of this, in the second embodiment according to the present invention, by subjecting the objective site of the cast body to a surface treatment by an acid treatment, to adjust the surface roughness as described above, it is possible to form the alumina barrier layer stably over the entire objective site.

In the cast product of the second embodiment according to the present invention, it is preferred that Cr oxide scale scattered on the alumina barrier layer is less than 20 area % of the product surface and the alumina barrier layer occupies 80 area % or more when the surface of the product is examined by SEM/EDX.

Also it is desired that the alumina barrier layer covers 50% or more of the bent portion, and has a thickness of 0.05 µm or more by subjecting a straight tube to a bending process before acid treatment, and then conducting a treatment by acid containing the polyhydric alcohol liquid.

Third Embodiment

The third embodiment according to the present invention obtains a cast product in which a welded part is formed by a so-called "alumina barrier layer" containing $Al_2O_3$, by joining a first cast body and a second cast body made of a heat resistant alloy containing 15% or more of Cr and 20% or more of Ni, and 2 to 4% of Al by welding, and subjecting a welded part between the welded first cast body and the second cast body to a surface treatment, and then subjecting the welded part to a heat treatment.

The influence of the component contained in the cast product is described in the part of <Description of reason for component limitation> in the first embodiment.

The contents of the components contained in the cast product of the third embodiment are identical to those in the second embodiment.

<Cast Body>

The first cast body and the second cast body forming the cast product of the third embodiment according to the present invention are casted to have the aforementioned composition by producing molten metal, followed by centrifugal casting, stationary casting or the like.

The obtained first cast body and second cast body may be joined by welding into a shape suited for the intended use.

Before conducting welding, edge preparation or the like may be conducted as is necessary.

In the third embodiment according to the present invention, the welding method and the composition of the welding electrode used at the time of welding are not limited, and as a method capable of welding the cast bodies of the present invention, TIG welding and arc welding can be recited.

In the cast bodies joined by welding, a welded part including a heat influenced part and a molten metal part is formed in the joint portion regardless of whether a previous surface treatment is conducted. Residual stress and strain arise in this heat influenced part, and Cr migrates along the strain line of the heat influenced part, and Cr oxide is likely to be generated dominantly, and $Al_2O_3$ is difficult to be generated.

In such a welded part, even if a heating treatment is conducted in a subsequent step, it is impossible to sufficiently form $Al_2O_3$ that forms the alumina barrier layer.

For this reason, in the third embodiment according to the present invention, after joining the cast bodies by welding, a surface treatment is conducted on an objective site that is to be in contact with a high temperature atmosphere during use of the product, to adjust the surface roughness of the site, and then a heating treatment is conducted in an oxidizing atmosphere.

<Surface Treatment>

As a surface treatment, a polishing treatment can be exemplified. It is desired that the surface treatment is conducted on the entire objective site that is to be in contact with a high temperature atmosphere during use of the product. It is not necessary to treat the entire objective site concurrently, and the part other than the welded part may be previously subjected to a surface treatment or the like to adjust the surface roughness, and the surface treatment may be conducted only on the welded part or only on and around the welded part.

The surface treatment may be conducted so that the surface roughness (Ra) of the objective site is 0.05 µm to 2.5 µm. More desirably, the surface roughness (Ra) is 0.5 to 1.0

The influence of the surface roughness (Ra) is described in the part <Surface treatment> in the first embodiment.

When the surface treatment is conducted by a polishing treatment, it is desired to conduct finish polishing with the use of #240 to #1200 after conducting paper polishing with the use of #12 to #220.

In the case of an acid treatment, the surface treatment can be achieved by dipping the objective site in a corrosive liquid for a predetermined time, or by applying a corrosive liquid. The acid used in the acid treatment may contain alcohol besides acid. The corrosive liquid adhered to the objective site after the acid treatment is desirably washed out by water washing or the like.

<Heat Treatment>

After conducting the surface treatment on the welded cast bodies, a heat treatment is conducted in the same condition as described in the part <Heat treatment> in the first embodiment.

<Cast Product>

As described above, by sequentially conducting the welding, the surface treatment and the heat treatment on the welded part, it is possible to obtain a cast product in which an alumina barrier layer is stably formed in the welded part including the heat influenced part and the molten metal part of the cast bodies arising by the welding.

<Alumina Barrier Layer>

In the third embodiment according to the present invention, after joining cast bodies of intended use by welding as described above, a site that is to be in contact with a high temperature atmosphere during use of the product is subjected to a surface treatment, and the surface roughness of the site is adjusted, and then the site is subjected to a heating treatment in an oxidizing atmosphere, and thereby $Al_2O_3$ is continuously formed as an alumina barrier layer on the surface continuing across the welded part of the cast product. As a result, the alumina barrier layer is formed not only on the surface of the cast bodies, but also in the welded part including a heat influenced part arising in the abutting surface of the cast bodies by the welding.

The thickness of the alumina barrier layer formed on the cast bodies is 0.05 µm or more and 3 µm or less for effective exertion of barrier function, and is preferably about 1 µm on average. More desirably, the thickness of the alumina barrier layer is 0.5 µm or more and 1.5 µm or less.

In the cast body having the aforementioned composition of Cr—Ni—Al heat resistant alloy, an alumina barrier layer will not be formed particularly in the welded part having large surface roughness when the heating treatment is conducted in an oxidizing atmosphere without conducting a surface treatment after conducting the welding. Therefore, it is influenced by oxidation, cementation or the like from the welded part.

Further, Cr oxide scale based on $Cr_2O_3$ is dispersedly formed on the superficial surface of the cast bodies, and is easy to peel off as described above, and at the time of peeling off, the alumina barrier layer beneath the same can peel off together.

In light of this, in the third embodiment according to the present invention, by adjusting the surface roughness by a surface treatment of a cast product after joining the cast bodies by welding and before formation of an alumina barrier layer by a heat treatment as described above, it is possible to form an alumina barrier layer stably in a welded part including a heat influenced part of the cast bodies arising by welding.

In the cast product of the third embodiment according to the present invention, it is preferred that Cr oxide scale scattered on the alumina barrier layer is less than 20 area % of the product surface and the alumina barrier layer occupies 80 area % or more when the surface of the product is examined by SEM/EDX.

Example 1

Molten metal was produced by atmospheric melting in a high frequency induction melting furnace, and specimen tubes having the alloy chemical compositions as shown in Table 1 below (outer diameter 59 mm, thickness 8 mm, length 3000 mm) were casted by centrifugal casting. Specimen Nos. 11 to 23 are inventive examples, and specimen Nos. 101 to 105 are comparative examples.

More concretely, the comparative examples include specimen Nos. 101 to 104 which are comparative examples containing a larger amount of Ce than La in comparison with the alloy chemical composition of the present invention, and specimen No. 105 which is a comparative example in which the content of La is less than 80% with respect to the total amount of La and Ce.

TABLE 1

| | NO. | C | Si | Mn | Cr | Ni | Al | Ce | La | W | Mo | Ti | Nb | MASS %<br>B |
|---|---|---|---|---|---|---|---|---|---|---|---|---|---|---|
| INVENTIVE EXAMPLE | 11 | 0.43 | 0.39 | 0.8 | 23.1 | 32.0 | 3.0 | | 0.15 | 1.56 | | 0.12 | | |
| INVENTIVE EXAMPLE | 12 | 0.41 | 0.26 | 0.4 | 23.8 | 34.4 | 3.1 | | 0.11 | 0.95 | | | 1.3 | |
| INVENTIVE EXAMPLE | 13 | 0.35 | 0.33 | 0.6 | 24.1 | 34.7 | 3.5 | | 0.01 | | 0.89 | | | |
| INVENTIVE EXAMPLE | 14 | 0.43 | 0.51 | 0.4 | 24.9 | 34.3 | 3.8 | | 0.04 | 1.1 | | 0.11 | | |
| INVENTIVE EXAMPLE | 15 | 0.46 | 0.47 | 0.9 | 24.8 | 35.1 | 2.7 | | 0.20 | 1.18 | | | | |
| INVENTIVE EXAMPLE | 16 | 0.46 | 0.41 | 0.5 | 23.5 | 34.6 | 3.9 | | 0.07 | 0.9 | | | | 0.06 |
| INVENTIVE EXAMPLE | 17 | 0.33 | 0.12 | 0.17 | 25.0 | 33.4 | 3.9 | 0.02 | 0.09 | 0.83 | | 0.12 | | |
| INVENTIVE EXAMPLE | 18 | 0.34 | 0.46 | 0.16 | 24.7 | 32.9 | 3.5 | 0.03 | 0.12 | 2.8 | | 0.19 | | |
| INVENTIVE EXAMPLE | 19 | 0.46 | 0.49 | 0.9 | 24.3 | 43.6 | 2.1 | | 0.16 | | 1.5 | 0.12 | | |
| INVENTIVE EXAMPLE | 20 | 0.43 | 0.62 | 1.1 | 22.1 | 29.3 | 3.4 | 0.05 | 0.31 | 0.6 | 0.5 | | | |
| INVENTIVE EXAMPLE | 21 | 0.38 | 0.38 | 0.5 | 26.3 | 36.7 | 2.0 | | 0.33 | 1.6 | | 0.29 | | |
| INVENTIVE EXAMPLE | 22 | 0.31 | 0.49 | 0.32 | 24.5 | 40.1 | 2.7 | 0.01 | 0.24 | 2.1 | | 0.5 | 0.8 | |
| INVENTIVE EXAMPLE | 23 | 0.41 | 0.33 | 0.7 | 23.8 | 31.5 | 2.6 | 0.05 | 0.21 | | 2.8 | | | 0.04 |
| COMPARATIVE EXAMPLE | 101 | 0.37 | 0.42 | 0.7 | 24.4 | 33.2 | 2.8 | 0.12 | 0.05 | 2.82 | | 0.12 | | |
| COMPARATIVE EXAMPLE | 102 | 0.45 | 0.56 | 0.6 | 23.8 | 29.7 | 3.8 | 0.12 | 0.03 | 1.5 | | 0.21 | | |
| COMPARATIVE EXAMPLE | 103 | 0.45 | 1.43 | 1.3 | 22.9 | 34.7 | 2.4 | 0.19 | 0.05 | 3.15 | | 0.23 | | |
| COMPARATIVE EXAMPLE | 104 | 0.46 | 0.54 | 0.28 | 23.9 | 29.7 | 3.7 | 0.11 | 0.02 | 1.51 | | 0.2 | | |
| COMPARATIVE EXAMPLE | 105 | 0.41 | 0.23 | 0.9 | 26.4 | 38.4 | 3.0 | 0.07 | 0.18 | 0.9 | 1.34 | | | |

<Surface Treatment>

For these specimen tubes, a skiving process which is rough processing, and a surface treatment by paper polishing were conducted on the inner surface of the tubes, and the surface roughness (Ra) was adjusted to 1.0 μm.

<Heat Treatment>

After the surface treatment, for all specimen tubes, a treatment of heating in atmospheric air (oxygen about 21%), at 1000° C. for 10 hours, and cooling the furnace after the heating was conducted.

<High Temperature Ductility Test>

A tensile test piece was prepared from a specimen tube in conformance with JIS Z 2201, and a ductility test was conducted. Concretely, the test piece was processed to have a parallel part diameter of 10 mm and a parallel part length of 50 mm, and ductility test was conducted according to the metal material tensile test method of JIS G 0567. The test was conducted at 1100° C.

The results of respective tests described above are shown in Table 2.

TABLE 2

|  | NO. | TEST TEMPERATURE (° C.) | TENSILE STRENGTH (Mpa) | ELONGATION (%) |
|---|---|---|---|---|
| INVENTIVE EXAMPLE | 11 | 1100 | 59.1 | 30.0 |
| INVENTIVE EXAMPLE | 12 | 1100 | 60.2 | 23.1 |
| INVENTIVE EXAMPLE | 13 | 1100 | 52.4 | 35.6 |
| INVENTIVE EXAMPLE | 14 | 1100 | 58.7 | 40.1 |
| INVENTIVE EXAMPLE | 15 | 1100 | 57.7 | 34.0 |
| INVENTIVE EXAMPLE | 16 | 1100 | 58.0 | 32.5 |
| INVENTIVE EXAMPLE | 17 | 1100 | 49.8 | 37.4 |
| INVENTIVE EXAMPLE | 18 | 1100 | 51.2 | 30.2 |
| INVENTIVE EXAMPLE | 19 | 1100 | 57.0 | 36.8 |
| INVENTIVE EXAMPLE | 20 | 1100 | 55.0 | 27.8 |
| INVENTIVE EXAMPLE | 21 | 1100 | 56.4 | 23.7 |
| INVENTIVE EXAMPLE | 22 | 1100 | 51.2 | 24.2 |
| INVENTIVE EXAMPLE | 23 | 1100 | 53.2 | 21.3 |
| COMPARATIVE EXAMPLE | 101 | 1100 | 52.1 | 3.3 |
| COMPARATIVE EXAMPLE | 102 | 1100 | 53.4 | 3.3 |
| COMPARATIVE EXAMPLE | 103 | 1100 | 29.7 | 1.0 |
| COMPARATIVE EXAMPLE | 104 | 1100 | 56.0 | 4.2 |
| COMPARATIVE EXAMPLE | 105 | 1100 | 53.8 | 4.1 |

<Discussion of Test Results>

Regarding tensile strength, Table 2 reveals that specimen Nos. 11 to No. 23 which are inventive examples are almost comparable with specimen Nos. 101 to No. 105 which are comparative examples.

Regarding elongation (high temperature tensile ductility), the inventive example is about 10 times the comparative example.

Excellent elongation (high temperature tensile ductility) in specimen Nos. 11 to No. 23 which are inventive examples is attributed to the fact that the generation amount of Ni—La compounds such as $Ni_2La$ and $Ni_3La$ having excellent high temperature tensile ductility can be increased by making the content of La in the rare earth element 80% or more.

On the other hand, poor elongation (high temperature tensile ductility) in specimens 101 to 105 which are comparative examples is attributed to the fact that the generation amount of Ni—Ce compounds such as $Ni_2Ce$ and $Ni_3Ce$ is large due to a high content of Ce in the rare earth element, namely a content of La of less than 80%, and this causes high temperature brittleness.

Regarding the inventive examples, specimen No. 18 containing 0.12% of La and 0.03% of Ce as the rare earth element shows elongation (high temperature tensile ductility) comparable with those in other inventive examples. This is because the generation amount of the Ni—Ce compounds can be controlled by making Ce 0.1% or less.

In both of the inventive examples and comparative examples, film thickness and the area percentage of the alumina barrier layer were excellent, and for inventive examples, when the specimen piece is plated with Ni, and covered with stainless sheet thereon, and further coated with resin thereon, and then a section SEM analysis was conducted, it was found that a preferred alumina barrier layer of 0.05 μm or more and 3 μm or less was formed in any examples.

As shown in the above example, the cast product of the present invention is not only able to form a uniform alumina barrier layer on the entire surface of the cast body, and effectively prevent oxygen, carbon, nitrogen and the like from entering from external atmosphere, but also has excellent high temperature tensile ductility.

In the above example, the specimen tubes were produced by centrifugal casting, however, similar results can be obtained by stationary casting.

Example 2

Molten metal was produced by atmospheric melting in a high frequency induction melting furnace, and a specimen tube (outer diameter 59 mm, thickness 8 mm, length 3000 mm) containing C: 0.4 mass %, Si: 1.3 mass %, Mn: 1.1 mass %, Cr: 24.3 mass %, Ni: 34.7 mass %, Al: 3.36 mass %, rare earth element: 0.25 mass %, W: 2.9 mass %, Ti: 0.12 mass %, and the remainder of Fe and an inevitable impurity was casted by mold centrifugal casting. Specimen Nos. 201 to 209 are inventive examples, specimen Nos. 311 to 312 are reference examples, and specimen No. 421 is a comparative example.

For every specimen tube, a skiving process was conducted on the inner surface, and the surface roughness (Ra) was adjusted to 0.6 μm.

<Acid Treatment>

As shown in Table 3, specimen Nos. 201 to No. 209 which are inventive examples were dipped in an acid solution containing a polyhydric alcohol liquid for 3 minutes or for 10 minutes.

Specimen Nos. 311 and No. 312 which are reference examples were dipped in an acid solution not containing a polyhydric alcohol liquid in a similar manner.

The inventive examples and reference examples subjected to an acid treatment were washed with water after the acid treatment.

Specimen No. 421 which is a comparative example was not subjected to an acid treatment.

TABLE 3

| SPECIMEN NO. | | ACID SOLUTION | MIXING RATIO (% BY VOLUME) | | | DIPPING TIME | SURFACE ROUGHNESS Ra (μm) | ALUMINA | |
| --- | --- | --- | --- | --- | --- | --- | --- | --- | --- |
| | | | NITRIC ACID | HYDROCHLORIC ACID | POLY-HYDRIC ALCOHOL | | | FILM THICKNESS (μm) | FILM AREA PERCENTAGE (%) |
| 201 | INVENTIVE EXAMPLE | GLYCEREGIA LIQUID | 22.5 | 67.5 | 10 | 3 MINUTES | 0.74 | 0.1 | 75 |
| 202 | INVENTIVE EXAMPLE | | 22.5 | 67.5 | 10 | 10 MINUTES | 0.72 | 0.4 | 78.3 |
| 203 | INVENTIVE EXAMPLE | | 20 | 60 | 20 | 3 MINUTES | 0.56 | 0.7 | 91.7 |
| 204 | INVENTIVE EXAMPLE | | 20 | 60 | 20 | 10 MINUTES | 0.57 | 0.9 | 86.2 |
| 205 | INVENTIVE EXAMPLE | | 15 | 45 | 40 | 3 MINUTES | 0.45 | 0.6 | 93.2 |
| 206 | INVENTIVE EXAMPLE | | 15 | 45 | 40 | 10 MINUTES | 0.42 | 0.6 | 89.7 |
| 207 | INVENTIVE EXAMPLE | | 10 | 30 | 60 | 3 MINUTES | 0.52 | 0.5 | 72.4 |
| 208 | INVENTIVE EXAMPLE | GLYCOL LIQUID | 20 | 60 | 20 | 3 MINUTES | 0.53 | 0.8 | 90.2 |
| 209 | INVENTIVE EXAMPLE | | 20 | 60 | 20 | 10 MINUTES | 0.51 | 0.9 | 84.7 |
| 311 | REFERENCE EXAMPLE | AQUA REGIA | 75 | 25 | 0 | 3 MINUTES | 1.07 | N | N |
| 312 | REFERENCE EXAMPLE | | 75 | 25 | 0 | 10 MINUTES | 1.12 | N | N |
| 421 | COMPARATIVE EXAMPLE | WITHOUT ACID TREATMENT | 0 | 0 | 0 | 0 MINUTE | 0.6 | 0.7 | 63.1 |

<Surface Roughness (Ra)>

From each of the specimen tubes, a specimen piece of 20 mm wide×30 mm long was cut out, and surface roughness (Ra) of the inner surface of each specimen piece was measured. Also, for specimen Nos. 201 to No. 207, No. 311, No. 312 and No. 421, a surface photograph of the inner surface of the specimen piece was taken.

Measurement results of surface roughness (Ra) are shown in Table 3, and surface photographs of specimen pieces are shown in FIG. 1 to FIG. 10.

Table 3 reveals that in specimen Nos. 201 to No. 209 which are inventive examples, surface roughness (Ra) is adjusted within the range of 0.42 μm to 0.74 μm by conduction of the acid treatment. Also, FIG. 1 to FIG. 7 which are surface photographs reveal that every specimen piece has surface glaze, and the scratch occurring by the skiving process is smoothed by the acid treatment by the acid solution containing a polyhydric alcohol liquid.

In specimen Nos. 201 and No. 202, surface roughness (Ra) is increased in comparison with specimen No. 421 which is a comparative example not subjected to an acid treatment. However, comparison between the surface photographs of specimen Nos. 201 and No. 202 (FIG. 1 and FIG. 2) and the surface photograph of specimen No. 421 which is a comparative example (FIG. 10) reveals that although a large number of scratches by skiving process are observed in the vertical direction in specimen No. 421, most of such scratches disappear in specimen Nos. 201 and No. 202.

Specimen No. 311 and No. 312 which are reference examples dipped in an acid solution (aqua regia) not containing a polyhydric alcohol liquid have surface roughness (Ra) exceeding 1.0 μm, and the surface photographs thereof (FIG. 8 and FIG. 9) reveal that the surface do not have glaze. This is because the surface is excessively corroded by corrosion by the treatment only with strong acid, and asperity occurs adversely.

From the above, it can be found that by the treatment by acid containing a polyhydric alcohol liquid, surface roughness (Ra) is appropriately adjusted, and a specimen tube with no scratch is obtained.

<Heat Treatment>

For the specimen tubes having subjected to the surface treatment, a treatment of heating in atmospheric air (oxygen about 21%) at 1050° C. for 10 hours, and furnace cooling after the heating was conducted.

<Surface Measurement>

For each specimen piece after conduction of the heat treatment, thickness (μm) of the formed alumina barrier layer and area percentage (%) of the $Al_2O_3$ film in the surface of the test piece were measured. The measurement results are described in the aforementioned Table 3.

Thickness of an alumina barrier layer was measured by a SEM (scanning electron microscope). The specimen in which an alumina barrier layer was not generated, and the specimen in which the site having a thickness of less than 0.5 μm (including the thickness of zero) appeared intermittently in a part of the alumina barrier layer, are marked with the character N (No) in Table 3.

Further, as to the area percentage of $Al_2O_3$ film in the surface of the test piece, distribution condition of Al was measured by surface analysis for a region of 1.35 mm×1 mm on the surface of the test piece by using a SEM/EDX measurement tester, and the distribution quantity was converted to an area percentage.

Further, for specimen Nos. 201 to No. 207, No. 311, No. 312 and No. 421 on which heat treatment was conducted, surface photographing of the inner surface of the specimen piece and section SEM analysis were conducted. In conducting the section SEM analysis, a specimen piece was plated with Ni, covered with a stainless sheet, and further coated with resin thereon.

Figure 18:
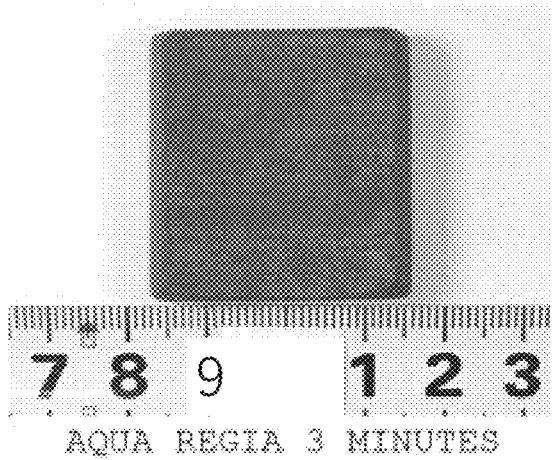
FIG. 18 is a surface photograph of specimen No. 311 which is a reference example in Example 2 after heat treatment.
Figure 19:
FIG. 19 is a surface photograph of specimen No. 312 which is a reference example in Example 2 after heat treatment.
Figure 20:
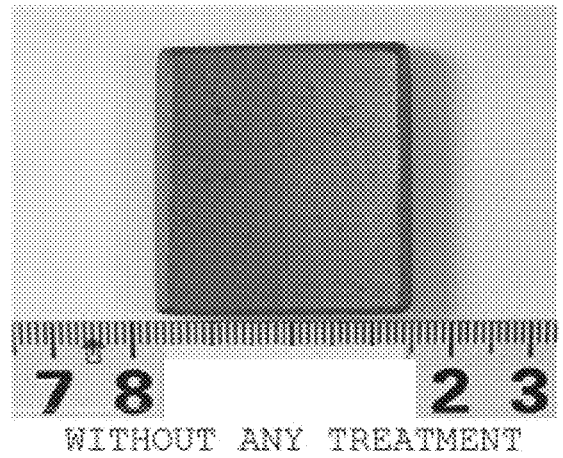
FIG. 20 is a surface photograph of specimen No. 421 which is a comparative example in Example 2 after heat treatment.
Figure 21:
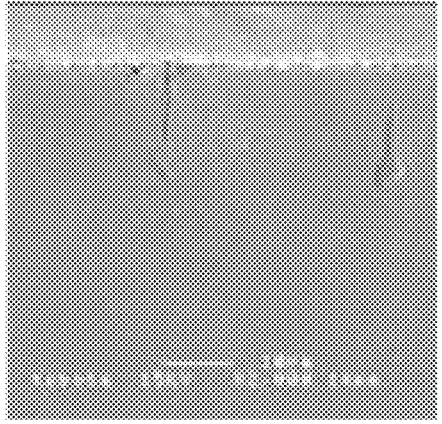
FIG. 21 is a section SEM photograph of specimen No. 201 which is an inventive example in Example 2.
Figure 22:
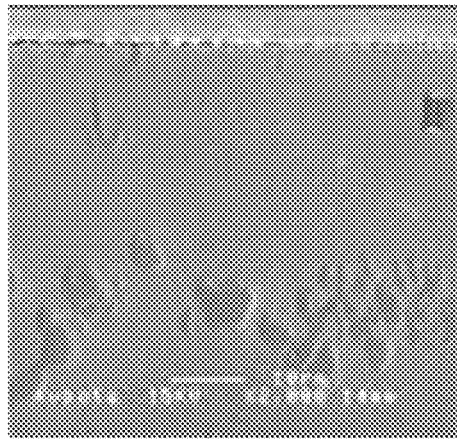
FIG. 22 is a section SEM photograph of specimen No. 202 which is an inventive example in Example 2.
Figure 23:
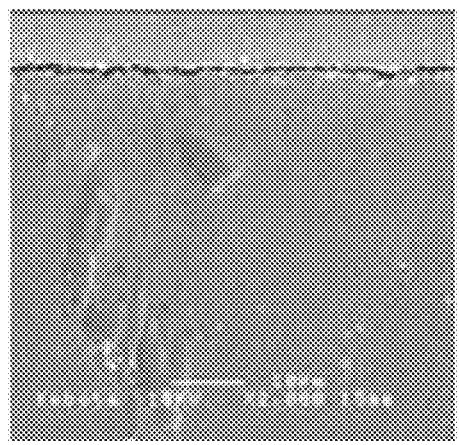
FIG. 23 is a section SEM photograph of specimen No. 203 which is an inventive example in Example 2.
Figure 24:
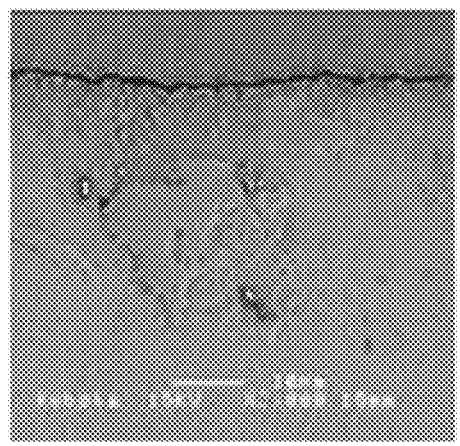
FIG. 24 is a section SEM photograph of specimen No. 204 which is an inventive example in Example 2.
Figure 25:
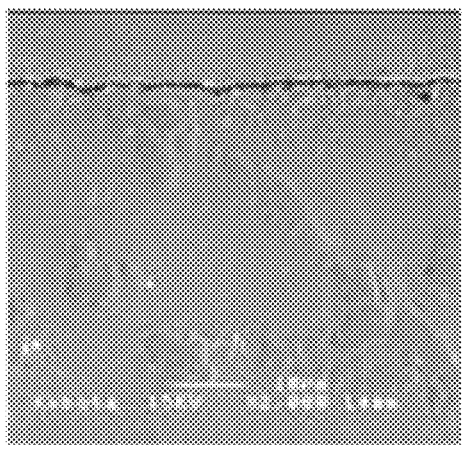
FIG. 25 is a section SEM photograph of specimen No. 205 which is an inventive example in Example 2.
Figure 26:
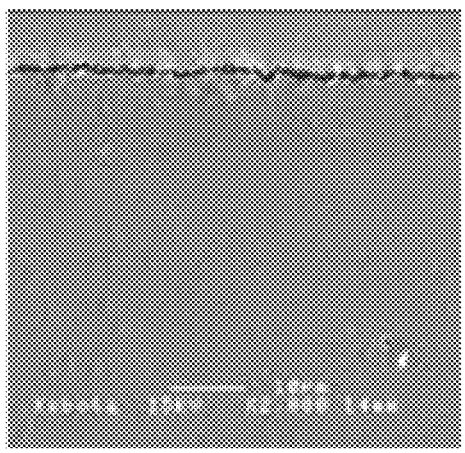
FIG. 26 is a section SEM photograph of specimen No. 206 which is an inventive example in Example 2.
Figure 27:
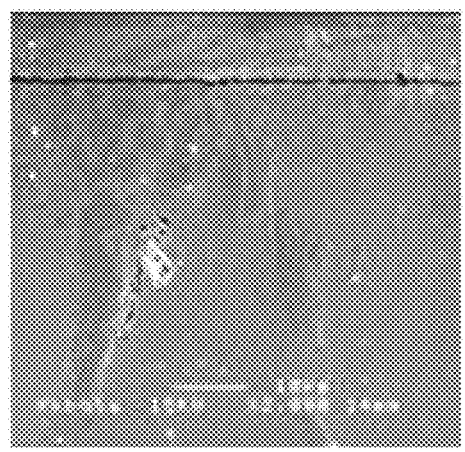
FIG. 27 is a section SEM photograph of specimen No. 207 which is an inventive example in Example 2.
Figure 28:
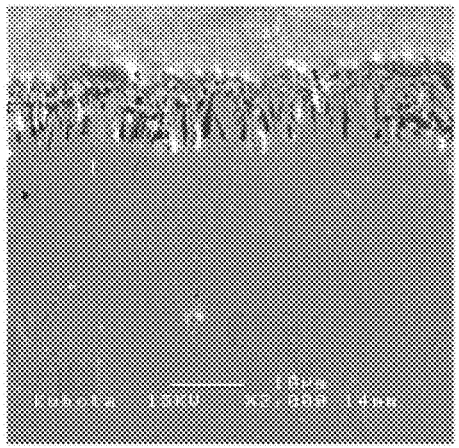
FIG. 28 is a section SEM photograph of specimen No. 311 which is a reference example in Example 2.
Figure 29:
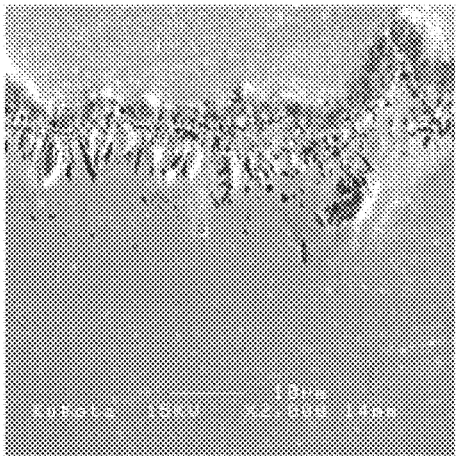
FIG. 29 is a section SEM photograph of specimen No. 312 which is a reference example in Example 2.
Figure 30:
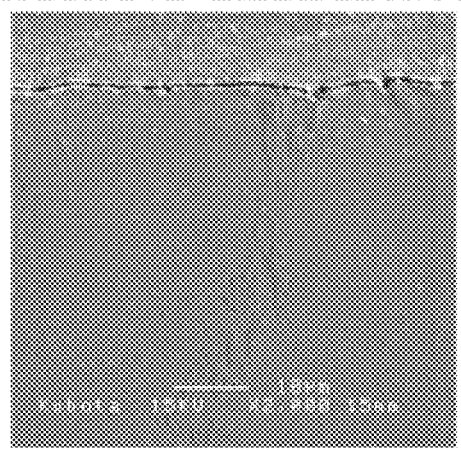
FIG. 30 is a section SEM photograph of specimen No. 421 which is a comparative example in Example 2.

FIG. 11 to FIG. 17 are surface photographs and FIG. 21 to FIG. 27 are section SEM photographs of specimen Nos. 201 to No. 207, and FIG. 18 to FIG. 20 are surface photographs and FIGS. 28 to 30 are section SEM photographs of specimen Nos. 311, No. 312 and No. 421.

Table 3 reveals that in any of specimen Nos. 201 to No. 209 which are inventive examples, the film thickness is 0.1 μm to 0.9 μm, and a desired alumina barrier layer is formed. Also FIG. 11 to FIG. 17, and FIG. 21 to FIG. 27 reveal that a uniform alumina barrier layer is formed on the entire surface. This is because surface roughness (Ra) is adjusted by the acid solution containing a polyhydric alcohol liquid, and scratches and the like by skiving process are also smoothed.

Comparing between inventive examples, in specimen Nos. 201 and No. 202 in which the polyhydric alcohol liquid is 10%, and in specimen No. 207 in which the polyhydric alcohol liquid is 60%, the area percentage of the film is less than 80%, and is somewhat inferior to other inventive examples.

The low area percentage of each film in specimen Nos. 201 and No. 202 in which the polyhydric alcohol liquid is 10% is attributable to the fact that the oxidizing power cannot be sufficiently adjusted by the polyhydric alcohol liquid as a result of increase in the acid solution, and asperity is formed by corrosion, and thus surface roughness (Ra) is increased in comparison with other inventive examples.

The low area percentage of film in specimen No. 207 in which the polyhydric alcohol liquid is 60% is attributable to the fact that the oxidizing power of the acid solution is decreased as a result of increase in the polyhydric alcohol liquid, and sufficient adjustment of surface roughness (Ra) by corrosion cannot be achieved.

These suggest that the polyhydric alcohol liquid contained in the acid solution is preferably more than 10% and 40% or less.

On the other hand, in specimen Nos. 311 and No. 312 which are reference examples, formation of a film is little observed as shown in Table 3, FIG. 18 and FIG. 19. This is because as shown in FIG. 28 and FIG. 29, as a result of conducting an acid treatment only by strong acid, the surface of the base material is rough, and formation of an alumina barrier layer is inhibited.

As to specimen No. 421 which is a comparative example, as shown in Table 3, FIG. 20 and FIG. 30, surface roughness (Ra) is preferable, and film is formed, however, it can be realized that the formed film is not continuous. This is because formation of the alumina barrier layer is inhibited by scratches occurring by a skiving process.

As shown in the above examples, since the cast product of the present invention has high ductility and a uniform alumina barrier layer generated on the surface of the cast body, it is resistant to peeling even when it is exposed to repeated heating and cooling cycles, and since the alumina barrier layer is tight, excellent repetitive oxidation resistance is exerted in use in a high temperature atmosphere, and entry of oxygen, carbon, nitrogen and the like from the external atmosphere is effectively prevented, and excellent repetitive oxidation resistance at high temperature, cementation resistance, nitriding resistance, corrosion resistance and so on can be maintained for a long term.

The present invention may be applied to cast products for which a horning process or the like cannot be effected, such as a long cast product and a cast product subjected to a bending process, and as a result, a preferable alumina barrier layer can be formed.

Example 3

Molten metal was produced by atmospheric melting in a high frequency induction melting furnace, and respectively two tube bodies (outer diameter 59 mm, thickness 8 mm, length 3000 mm) having alloy chemical compositions as recited in Table 4 below were casted by mold centrifugal casting, and edge preparation was conducted in one side of the tube bodies, and tube bodies having the same composition and are to be a pair were joined by abutment welding.

In Table 4, "REM" indicates a rare earth element.

The obtained specimen tubes include specimen tubes No. 501 to No. 508 which are examples of the present invention, and specimen tubes No. 611 to No. 613 which are comparative examples. More concretely, the comparative examples include specimen tube No. 611 which is a comparative example containing more Al than that in the alloy chemical composition of the present invention, specimen tube No. 612 which is a comparative example containing more Ni than that in the alloy chemical composition of the present invention, and specimen tube No. 613 which is a comparative example having the alloy chemical composition falling within the present invention but not subjected to a surface treatment in the welded part.

TABLE 4

| SPECIMEN NO. | ALLOY CHEMICAL COMPOSITION (REMAINDER OF Fe AND INEVITABLE IMPURITY) (MASS %) | | | | | | | | | | | | SURFACE ROUGHNESS (Ra) |
|---|---|---|---|---|---|---|---|---|---|---|---|---|---|
| | C | Si | Mn | Cr | Ni | Al | REM | W | Mo | Ti | Zr | Nb | B | |
| 501 | 0.4 | 1.5 | 1.2 | 25.2 | 35.0 | 3.1 | 0.22 | 3.0 | | 0.09 | 0.11 | | | 0.9 |
| 502 | 0.26 | 1.4 | 1.2 | 23.8 | 44.4 | 3.5 | 0.13 | | 2.1 | | | 1.6 | | 0.07 |
| 503 | 0.41 | 1.5 | 1.1 | 23.9 | 33.4 | 2.9 | 0.19 | | 2.9 | 0.12 | | | | 2.40 |
| 504 | 0.48 | 1.4 | 0.2 | 23.5 | 34.6 | 3.0 | 0.17 | 1.54 | | 0.12 | | | | 0.68 |
| 505 | 0.45 | 1.3 | 1.2 | 25.4 | 34.8 | 2.7 | 0.23 | 2.7 | | | | | | 0.11 |
| 506 | 0.44 | 1.2 | 1.2 | 17.5 | 69 | 3.4 | 0.33 | 3.5 | | | | | 0.05 | 0.13 |
| 507 | 0.34 | 0.7 | 1.2 | 25.0 | 45.4 | 2.8 | 0.10 | | 1.5 | | | 2 | | 2.9 |
| 508 | 0.38 | 0.5 | 0.2 | 23.9 | 33.9 | 3.3 | 0.23 | 2.7 | | 0.09 | | | | 0.03 |
| 611 | 0.37 | 1.3 | 1 | 24.4 | 33.9 | 5.6 | 0.3 | 3.1 | | | | | | 0.11 |
| 612 | 0.40 | 1.3 | 0.9 | 25.4 | 12.1 | 3.0 | 0.29 | 2.9 | | | | | | 0.12 |
| 613 | 0.40 | 0.4 | 0.2 | 23.8 | 32.5 | 3.1 | 0.17 | 2.4 | | | | | | 6.2 |

<Surface Treatment>

For these specimen tubes, skiving which is rough processing was conducted in the region extending about 20 mm to 40 mm in the width direction centered at the welded part in the inner side of the tube.

Further, for specimen tubes No. 501 to No. 508, No. 611 and No. 612 (namely, other than Specimen tube No. 613), a surface treatment by paper polishing was conducted.

Surface roughness (Ra) in a welded part of each specimen tube is shown in Table 4.

<Visual Observation Before Heat Treatment>

Figure 31:
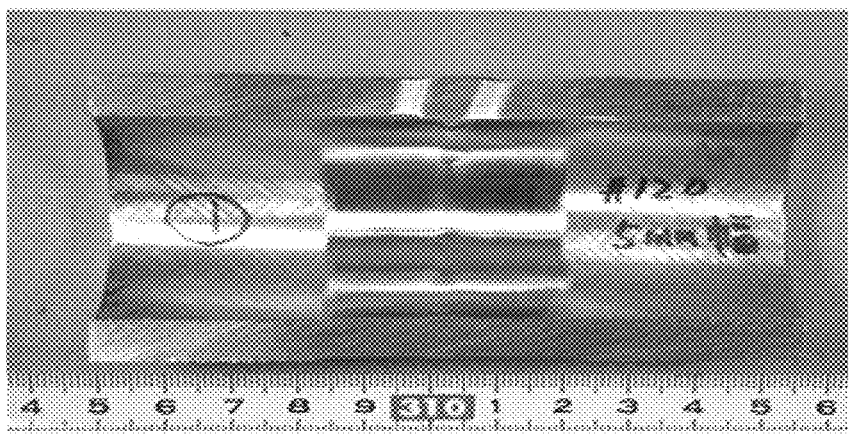
FIG. 31 is a section photograph taken by axially cutting specimen tube No. 504 which is an inventive example in Example 3.
Figure 32:
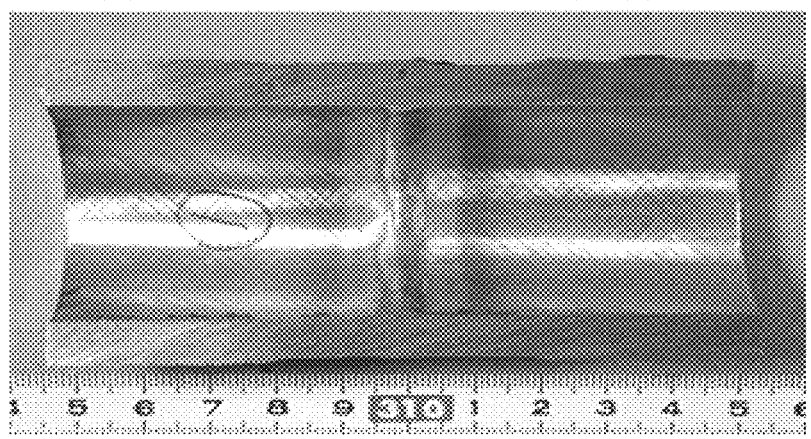
FIG. 32 is a section photograph taken by axially cutting specimen tube No. 613 which is a comparative example in Example 3.

For specimen tube No. 504 which is an inventive example, and specimen tube No. 613 which is a comparative example, photographs of the specimen tubes cut along the axial direction are respectively shown in FIG. 31 and FIG. 32.

Comparison between FIG. 31 and FIG. 32 reveal that specimen No. 504 which is an inventive example has glaze in the welded part, and has reduced asperity of the welded part as a result of the surface treatment.

<Heat Treatment>

After the surface treatment, for every specimen tube, a treatment of heating in atmospheric air (oxygen about 21%), at 1000° C. for 10 hours, and cooling the furnace after the heating was conducted.

<Surface Measurement>

For each test tube having subjected to the aforementioned treatments, a specimen piece of 20 mm wide×30 mm long including a welded part was cut out, and film thickness (μm) of the alumina barrier layer formed in the welded part inside the specimen piece and area percentage (%) of $Al_2O_3$ were measured. The measurement methods will be described below, and the measurement results are described in Table 5 as "film thickness" and "area percentage".

<Measurement of Film Thickness>

Thickness of an alumina barrier layer for the welded part surface of a specimen piece was measured by a SEM (scanning electron microscope). The specimen in which an alumina barrier layer was not generated, and the specimen in which the site having a thickness of less than 0.05 μm (including the thickness of zero) appeared intermittently in a part of the alumina barrier layer, are marked with the character N (No) in Table 5.

<Measurement of Area Percentage of Film>

Area percentage of $Al_2O_3$ to the surface of the welded part of the specimen piece was determined by using a SEM/EDX (scanning analytical electron microscope) measurement tester. Measurement was conducted for a region of 1.35 mm×1 mm on the surface of the welded part of the specimen piece, and distribution condition of Al was surface analyzed, and the distribution quantity was converted to area percentage.

<Ductility Test>

A tensile test piece was prepared from a specimen tube in conformance with JIS 22201, and a ductility test was conducted.

Concretely, the test piece was processed to have a parallel part diameter of 10 mm and a parallel part length of 50 mm including the welded part, and ductility test was conducted according to the metal material tensile test method of JIS 22241. The test was conducted at room temperature because difference arises more clearly, than as it is conducted at high temperature.

The results of the aforementioned tests are shown in Table 5. In Table 5, the indication of "-" means that the measurement or the test was not conducted.

TABLE 5

| SPECIMEN NO. | FILM THICKNESS (μm) | AREA PERCENTAGE (%) | TENSILE DUCTILITY (%) |
|---|---|---|---|
| 501 | 0.07 | 94.6 | 9.5 |
| 502 | 0.8 | 86.6 | 25.4 |
| 503 | 1.8 | 82.5 | 12.5 |
| 504 | 0.6 | 99.5 | 10.5 |
| 505 | 1 | 88.3 | 12.2 |
| 506 | 0.9 | 96.2 | 18.2 |
| 507 | 0.8 | 76.3 | — |
| 508 | 1.1 | 71.8 | — |
| 611 | 1.7 | 98.0 | 0.4 |
| 612 | N | 62.4 | 11.4 |
| 613 | N | 53.1 | — |

<Discussion of Test Results>

Table 5 reveals that specimen tubes No. 501 to No. 508 which are inventive examples show better film thickness of the alumina barrier layer and area percentage in comparison with specimen tubes No. 611 to No. 613 which are comparative examples.

In the discussion of inventive examples, it can be found that any film thickness falls within the preferred range of 0.05 μm or more and 3 μm or less. It is also revealed that the tensile ductility is sufficient.

Comparison of inventive examples reveals that specimen tubes No. 507 and No. 508 are inferior in film thickness and area percentage to other inventive examples, and this is attributed to the fact that surface roughness by a surface treatment of specimen tube No. 507 is large, and surface roughness by a surface treatment of specimen tube No. 508 is too fine. Therefore, it can be found that the surface treatment conducted on the welded part preferably makes the surface roughness (Ra) of 0.05 μm to 2.5 μm for making the alumina barrier layer of the welded part 80 area % or more.

On the other hand, as to the comparative example, specimen tube No. 611 is inferior in tensile ductility although a preferred alumina barrier layer is formed. This is because the content of Al in the alloy chemical composition exceeds 4%. Therefore, it is revealed that the content of Al is preferably 4% or less.

Further, in specimen tubes No. 612 and No. 613, a sufficient alumina barrier layer is not formed. In specimen tube No. 612, the content of Ni in the alloy chemical composition is smaller than 18%, and as a result the content of Fe is relatively large, and Cr—Fe—Mn oxide is more likely to be generated on the surface of the cast body, so that generation of an alumina barrier layer is inhibited.

In specimen No. 613, while the alloy chemical composition falls within the range of the present invention, the surface roughness is large, and generation of an alumina barrier layer is inhibited as a result of not conducting a surface treatment.

These reveal that a preferred alumina barrier layer is formed in the specimen tube which is an inventive example, in comparison with the specimen tube which is a comparative example.

<Section Analysis>

For specimen pieces obtained from specimen tube No. 504 which is an example of the present invention, and specimen tube No. 613 which is a comparative example, photographs of the section perpendicular to the welded part were taken, and section SEM analysis was conducted. For section SEM analysis, the specimen piece was plated with Ni, covered with a stainless steel sheet, and further coated with resin thereon.

Figure 33:
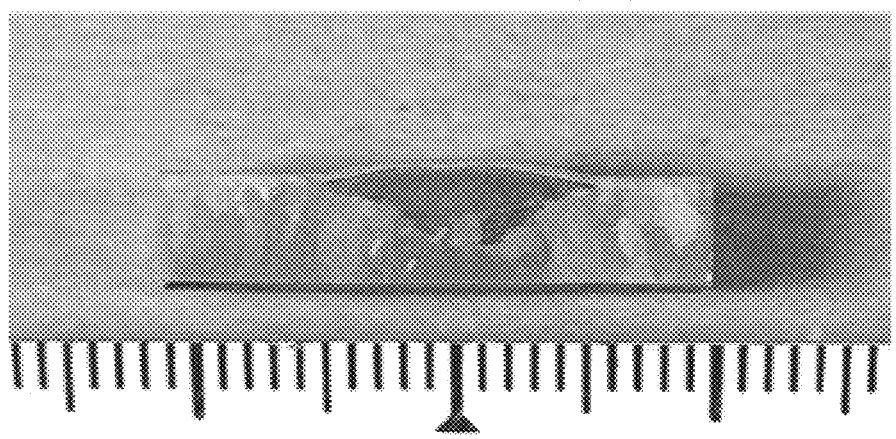
FIG. 33 is a section photograph of a specimen piece obtained from specimen tube No. 504 which is an inventive example in Example 3, taken perpendicularly to a welded part.
Figure 34:
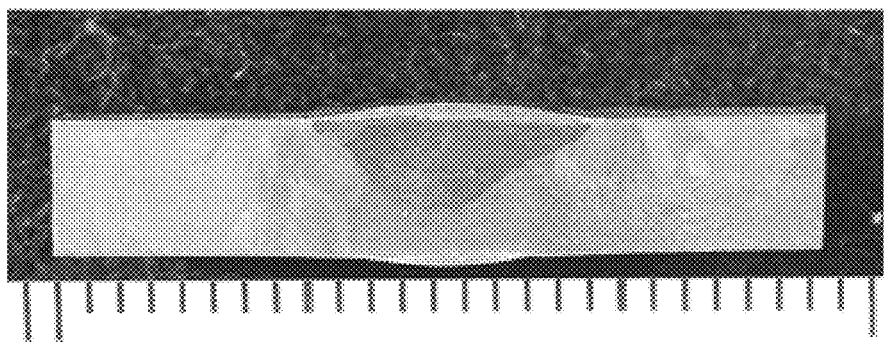
FIG. 34 is a section photograph of a specimen piece obtained from specimen tube No. 613 which is a comparative example in Example 3, taken perpendicularly to a welded part.
Figure 35:
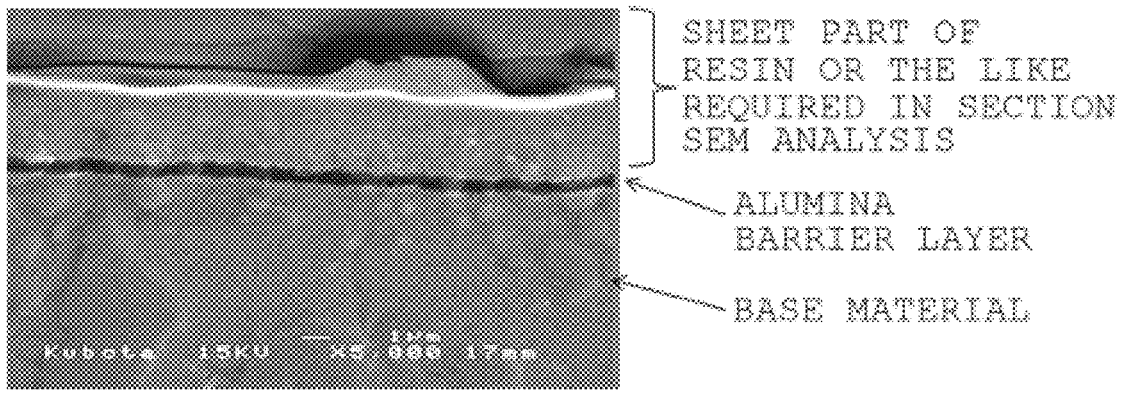
FIG. 35 is a photograph of specimen tube No. 504 which is an inventive example in Example 3 by section SEM analysis.
Figure 36:
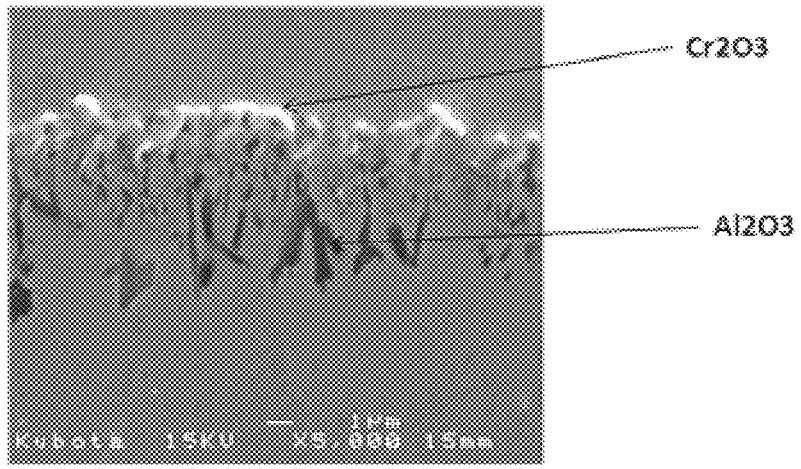
FIG. 36 is a photograph of specimen tube No. 613 which is a comparative example in Example 3 by section SEM analysis.

The obtained section photographs of the inventive example and the comparative example are respectively shown in FIG. 33 and FIG. 34, and enlarged photographs by section SEM analysis in the inventive example and the comparative example are respectively shown in FIG. 35 and FIG. 36.

From these drawings, it can be seen that in the inventive example, an alumina barrier layer having a film thickness of 0.5 μm is uniformly formed on the surface of the base material. On the other hand, it can be seen that in the comparative example, the asperity of the surface is significant, and an alumina barrier layer is not successfully formed.

Also from these section photographs, the advantage of the present invention would be recognized.

As shown in the above examples, in the cast body of the present invention, a uniform alumina barrier layer can be formed on the entire surface of the cast body including a welded part by conducting a heat treatment after subjecting the welded part to a surface treatment, so that entry of oxygen, carbon, nitrogen and the like from the external atmosphere is effectively inhibited, and the cast body as a whole including the welded part is able to keep the excellent repeated oxidation resistance at high temperature, cementation resistance, nitriding resistance, corrosion resistance and the like for a long term.

The present invention is useful as a cast product having an alumina barrier layer and a method for producing the same.

What is claimed is:

1. A method for producing a cast product having an alumina barrier layer, for use in a high temperature atmosphere, comprising:
   a step of conducting a treatment by an acid solution containing a polyhydric alcohol liquid on a surface of a cast body made of a heat resistant alloy containing 15 mass % or more of Cr and 20 mass % or more of Ni, and 2 mass % to 4 mass % of Al; and
   a heat treatment step for forming an alumina barrier layer containing $Al_2O_3$ on a surface by conducting a heat treatment on the cast body having subjected to the acid treatment.

2. The method for producing a cast product according to claim 1, wherein the acid treatment is conducted by a glyceregia liquid containing nitric acid, hydrochloric acid and glycerol, or by a glycol liquid containing glycol.

3. The method for producing a cast product according to claim 1, wherein the polyhydric alcohol liquid contained in the glyceregia liquid or the glycol liquid is more than 10 mass % and 40 mass % or less.

4. The method for producing a cast product according to claim 1, wherein the cast body is a tube body having a bent part, and subjected to a bending process prior to the acid treatment.

5. The method for producing a cast product according to claim 1, wherein an alumina barrier layer containing $Al_2O_3$ having a thickness of 0.05 μm or more is formed on the surface of the cast product by a heat treatment.

6. The method for producing a cast product according to claim 1, wherein the cast body contains C: 0.3 mass % to 0.7 mass %, Si: 0.1 mass % to 1.5 mass % or less, Mn: 0.1 mass % to less than 3.0 mass %, Cr: 15 mass % to 40 mass %, Ni: 20 mass % to 55 mass %, Al: 2 mass % to 4 mass %, rare earth element: 0.005 mass % to 0.4 mass %, W: 0.5 mass % to 5 mass % and/or Mo: 0.1 mass % to 3 mass %, and the remainder of Fe and an inevitable impurity.

7. The method for producing a cast product according to claim 6, wherein the cast body contains at least one kind of Ti: 0.01 mass % to 0.6 mass %, Zr: 0.01 mass % to 0.6 mass % and Nb: 0.1 mass % to 3.0 mass %.

8. The method for producing a cast product according to claim 6, wherein the cast body contains more than 0.01 mass % and 0.1 mass % or less of B.

9. The method for producing a cast product according to claim 7, wherein the cast body contains more than 0.01 mass % and 0.1 mass % or less of B.

10. The method for producing a cast product according to claim 1, wherein the alumina barrier layer containing $Al_2O_3$ is composed of $Al_2O_3$ in 80 area % or more of a surface of the alumina barrier layer.

11. The method for producing a cast product according to claim 5, wherein the alumina barrier layer containing $Al_2O_3$ is composed of $Al_2O_3$ in 80 area % or more of a surface of the alumina barrier layer.

* * * * *